United States Patent
Ying et al.

(10) Patent No.: US 10,687,216 B2
(45) Date of Patent: Jun. 16, 2020

(54) ANTITHEFT METHOD FOR MOBILE TERMINAL AND APPARATUS

(71) Applicant: Huawei Technologies Co., Ltd., Shenzhen (CN)

(72) Inventors: Jindong Ying, Shenzhen (CN); Zongbo Ye, Hod Hasharon (IL); Kan Li, Shanghai (CN); Wenguo Zhong, Shanghai (CN); Haibo Tu, Shenzhen (CN); Wenfang Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/333,136

(22) PCT Filed: Sep. 13, 2016

(86) PCT No.: PCT/CN2016/098876
§ 371 (c)(1),
(2) Date: Mar. 13, 2019

(87) PCT Pub. No.: WO2018/049564
PCT Pub. Date: Mar. 22, 2018

(65) Prior Publication Data
US 2019/0215696 A1 Jul. 11, 2019

(51) Int. Cl.
*H04W 12/12* (2009.01)
*H04M 11/04* (2006.01)
(Continued)

(52) U.S. Cl.
CPC ....... *H04W 12/1206* (2019.01); *H04L 9/0643* (2013.01); *H04L 9/3242* (2013.01);
(Continued)

(58) Field of Classification Search
CPC ......... H04W 12/1206; H04W 12/0609; H04W 12/0027; H04W 12/0013; H04W 12/1208;
(Continued)

(56) References Cited

U.S. PATENT DOCUMENTS

| 8,402,134 B1 * | 3/2013 | Hir ..................... H04W 12/1206 709/224 |
| 2010/0100972 A1 * | 4/2010 | Lemieux ................. G06F 21/57 726/34 |

(Continued)

FOREIGN PATENT DOCUMENTS

| CN | 100466861 C | 3/2009 |
| CN | 101588583 A | 11/2009 |

(Continued)

OTHER PUBLICATIONS

Machine Translation and Abstract of Chinese Publication No. CN100466861, Mar. 4, 2009, 22 pages.
(Continued)

*Primary Examiner* — Mazda Sabouri
(74) *Attorney, Agent, or Firm* — Conley Rose, P.C.

(57) ABSTRACT

In an antitheft method for a mobile terminal that relates to the field of communications technologies, a baseband processor detects integrity of an operating system running on an application processor, generates a short message service (SMS) message when the operating system has no integrity, and transfers the SMS message to the application processor. The application processor controls a display to display the SMS message in order to inform a user that the operating system of the mobile terminal is damaged. In a scenario in which a mobile terminal is stolen and an operating system is maliciously tampered with, according to the solution provided in this application, an SMS message is used to prompt a user, thereby improving security of the mobile terminal.

20 Claims, 14 Drawing Sheets

(51) Int. Cl.

| | | |
|---|---|---|
| *H04W 4/14* | (2009.01) | |
| *H04L 9/32* | (2006.01) | |
| *H04L 29/06* | (2006.01) | |
| *H04W 12/06* | (2009.01) | |
| *H04W 12/00* | (2009.01) | |
| *H04L 9/06* | (2006.01) | |
| *H04W 12/04* | (2009.01) | |
| *H04W 12/10* | (2009.01) | |

(52) U.S. Cl.
CPC ........ *H04L 9/3247* (2013.01); *H04L 63/1441* (2013.01); *H04L 63/166* (2013.01); *H04M 11/04* (2013.01); *H04W 4/14* (2013.01); *H04W 12/0013* (2019.01); *H04W 12/0027* (2019.01); *H04W 12/04* (2013.01); *H04W 12/0609* (2019.01); *H04W 12/10* (2013.01); *H04W 12/1208* (2019.01); *H04L 2209/80* (2013.01)

(58) Field of Classification Search
CPC ....... H04W 12/04; H04W 12/10; H04W 4/14; H04L 9/0643; H04L 63/166; H04L 63/1441; H04L 2209/80; H04L 9/3247; H04L 9/3242; H04M 11/04
See application file for complete search history.

(56) References Cited

U.S. PATENT DOCUMENTS

| | | | | |
|---|---|---|---|---|
| 2010/0251391 | A1* | 9/2010 | Adrangi ............ | H04W 12/1206 726/34 |
| 2011/0076986 | A1* | 3/2011 | Glendinning ........... | G06F 21/88 455/411 |
| 2011/0258247 | A1 | 10/2011 | Gordon | |
| 2013/0159704 | A1* | 6/2013 | Chandrasekaran ..... | G06F 21/57 713/156 |
| 2014/0199966 | A1* | 7/2014 | Schushan .......... | H04W 12/1206 455/411 |
| 2015/0008774 | A1 | 1/2015 | Yamanaka et al. | |
| 2017/0013464 | A1* | 1/2017 | Fish ..................... | H04W 12/12 |

FOREIGN PATENT DOCUMENTS

| | | |
|---|---|---|
| CN | 101662469 A | 3/2010 |
| CN | 101854445 A | 10/2010 |
| CN | 102014209 A | 4/2011 |
| CN | 102089764 A | 6/2011 |
| CN | 102387498 A | 3/2012 |
| CN | 102395102 A | 3/2012 |
| CN | 103118357 A | 5/2013 |
| CN | 103237064 A | 8/2013 |
| CN | 104279018 A | 1/2015 |
| CN | 105335677 A | 2/2016 |
| CN | 105554300 A | 5/2016 |

OTHER PUBLICATIONS

Machine Translation and Abstract of Chinese Publication No. CN101588583, Nov. 25, 2009, 14 pages.
Machine Translation and Abstract of Chinese Publication No. CN101854445, Oct. 6, 2010, 7 pages.
Machine Translation and Abstract of Chinese Publication No. CN102387498, Mar. 21, 2012, 13 pages.
Machine Translation and Abstract of Chinese Publication No. CN103237064, Aug. 7, 2013, 18 pages.
Machine Translation and Abstract of Chinese Publication No. CN105335677, Feb. 17, 2016, 35 pages.
Machine Translation and Abstract of Chinese Publication No. CN105554300, May 4, 2016, 21 pages.
Foreign Communication From a Counterpart Application, PCT Application No. PCT/CN2016/098876, English Translation of International Search Report dated May 31, 2017, 2 pages.
Foreign Communication From a Counterpart Application, PCT Application No. PCT/CN2016/098876, English Translation of Written Opinion dated May 31, 2017, 6 pages.
Machine Translation and Abstract of Chinese Publication No. CN101662469, Mar. 3, 2010, 10 pages.
Machine Translation and Abstract of Chinese Publication No. CN102014209, Apr. 13, 2011, 17 pages.
Machine Translation and Abstract of Chinese Publication No. CN102395102, Mar. 28, 2012, 20 pages.
Machine Translation and Abstract of Chinese Publication No. CN103118357, May 22, 2013, 9 pages.
Foreign Communication From a Counterpart Application, Chinese Application No. 201680089227.5, Chinese Office Action dated Nov. 27, 2019, 9 pages.

* cited by examiner

ANTITHEFT METHOD FOR MOBILE TERMINAL AND APPARATUS

CROSS-REFERENCE TO RELATED APPLICATIONS

This application is a U.S. National Stage of International patent application Ser. No. PCT/CN2016/098876 filed on Sep. 13, 2016 which is hereby incorporated by reference in its entirety.

TECHNICAL FIELD

Embodiments of the present invention relate to the field of communications technologies, and more specifically, to an antitheft technology for a mobile terminal.

BACKGROUND

A ROM of an intelligent terminal stores an operating system. The ROM is short for read-only memory (Read-Only Memory), and is a solid-state semiconductor memory from which only prestored data can be read. A characteristic of the ROM is that once data is stored, the data cannot be changed or deleted, and the data does not disappear due to power off. Generally, for system security, data is not allowed to be erased. Therefore, the operating system stored in the ROM can only be read but cannot be changed or erased. However, to implement system upgrade, a ROM can be modified and erased by using a program on a computer. "ROM flashing" people are talking about is ROM erasing. Alternatively, during system upgrade, an upgrade package can be downloaded to a storage device of a mobile phone, and then the upgrade package is installed on the intelligent terminal in a restart process after the upgrade package is verified, thereby updating information in a ROM. Herein, installation packages used for ROM flashing or system upgrade, such as a system update program package, a system upgrade program package, and a system transplantation program package that are used for a ROM of a mobile device, are collectively referred to as a ROM installation package.

To avoid a loss caused by a lost mobile phone, an operating system of the mobile terminal provides a lock screen function. A user may set a text password, a gesture password, a fingerprint password, a facial expression password, or a voice password for unlocking of a screen, so that other people have difficulties in unlocking the screen to perform an operation on the mobile terminal. This preliminarily protects data stored in an internal memory of the mobile terminal, but the screen still cannot be prevented from being unlocked through ROM flashing.

Some privacy protection or antitheft application software such as some security software may further be installed in a mobile terminal. An alternate phone number may be preset on the mobile terminal by using the software. When another SIM card is put into the lost mobile terminal, the mobile terminal automatically sends an SMS message to the alternate phone number, to inform the alternate phone number of a new phone number of the lost mobile terminal. After learning of the new phone number, the owner can send an SMS message to the new phone number to perform some particular operations, for example, perform a positioning operation. After the mobile terminal is lost, a thief usually prevents, through ROM flashing, the owner from retrieving the lost mobile terminal. When such security software or plugin components having a relatively high level are revoked or removed through ROM flashing, after another SIM card is put into the lost mobile terminal, because the security software is removed, a notification SMS message cannot be sent to the alternate phone number, and a new phone number of the lost mobile terminal with the changed SIM card cannot be learned of either. Consequently, the owner cannot send an SMS message notification to the lost mobile terminal, and antitheft functions such as positioning also become invalid.

SUMMARY

This specification describes an antitheft method for a mobile terminal and an apparatus, so as to improve security of the mobile terminal.

According to a first aspect, an embodiment of this application provides an antitheft method for a mobile terminal. The mobile terminal includes a baseband processor, an application processor, and a display. The method includes: detecting, by the baseband processor, integrity of an operating system running on the application processor, generating, by the baseband processor, a short message service (SMS) message when the baseband processor detects that the operating system has no integrity, where the SMS message is used to inform that the operating system has no integrity; transferring, by the baseband processor, the SMS message to the application processor; and controlling, by the application processor, the display to display the SMS message.

The application processor of the mobile terminal is responsible for running the operating system and various application programs. The baseband processor of the mobile terminal is responsible for controlling network communication of the mobile terminal. After the mobile terminal is lost, a person who picks up the mobile terminal or a thief usually tampers with the original operating system of the mobile terminal, and antitheft security software running on the original operating system also is uninstalled or is removed through ROM flashing or the like. However, usually, a network communication function of the baseband processor cannot be affected by using a method such as uninstalling the antitheft security software or ROM flashing. Therefore, an antitheft module may run on the baseband processor, and the integrity of the operating system running on the application processor is monitored by using the baseband processor. Usually, uninstalling the antitheft security software does not affect an SMS function of the mobile terminal. During ROM flashing, the original operating system is usually replaced with a third-party operating system, and the third-party operating system usually also has an SMS function. Therefore, ROM flashing and uninstalling the antitheft security software usually do not affect the SMS communication function of the mobile terminal. Usually, a user needs to know a phone number of a receiver and then can send an SMS message by using a network service of an operator of a wireless communications network. The SMS message usually includes a phone number of a sender. After the operating system of the mobile terminal is damaged, because the SMS message is displayed on the display, the thief who steals the mobile terminal is worried about behavioral exposure, and therefore is more willing to return the mobile terminal to the owner, thereby enhancing security of the mobile terminal.

In a possible design, the mobile terminal has an operating system tampering prompt function. The mobile terminal includes a first memory coupled to the baseband processor. The baseband processor encodes, by using an SMS message encoding format, particular content stored in the first memory, to generate the SMS message. When the baseband processor detects that the operating system running on the application processor has no integrity, an SMS message including particular content is constructed to inform the user that the operating system has been damaged, and to further prompt the user to restore to the original operating system, so as to ensure security of the operating system of the user. An operating system provided by a manufacturer of a mobile terminal usually has relatively high security performance, and some software services provided by the manufacturer are preset in the operating system. If the operating system is changed or replaced, a user cannot obtain the software services by using the mobile terminal. This may cause an economic loss to the terminal manufacturer, and may reduce user experience.

In a possible design, the first memory of the mobile terminal stores a phone number of a SIM card of the user. When detecting that the operating system has no integrity, a security agent detects a current SIM card identifier of the mobile terminal, compares the current SIM card identifier with a stored SIM card identifier, and if the current SIM card identifier is the same as the stored SIM card identifier, does not inform the user that the operating system has been tampered with.

In a possible design, after the integrity of the operating system of the mobile terminal is damaged, the mobile terminal still supports a remote message notification function. The mobile terminal includes a first memory coupled to the baseband processor. The baseband processor establishes, based on a user identity credential stored in the first memory, a connection between the mobile terminal and a remote server; receives, by using the connection, a first message sent by the remote server; and encodes the first message by using an SMS message encoding format, to generate the SMS message. After the mobile terminal is lost, the person who picks up the mobile terminal or the thief usually changes a SIM card, and the owner usually cannot know a phone number of a changed SIM card, and consequently, cannot contact the person who picks up the mobile terminal or the thief by using a call or an SMS message. The user identity credential (for example, an account password of the user or a service token) is stored in the first memory. In this way, after the operating system of the mobile terminal is damaged, the connection to the remote server can be established by using the stored user identity credential. The owner can log in to the remote server at a client by using a registered account password, and transfers the first message (for example, a text message) to the mobile terminal by using the remote server. After receiving the first message, the mobile terminal encodes the first message by using the SMS message encoding format, to generate the SMS message, and displays the SMS message on the display. The SMS message may include a phone number of the owner. If the thief views the SMS message, the thief is worried about identity leakage, and may contact the original user of the mobile terminal by using the phone number of the owner in the SMS message, and return the mobile terminal in time.

In a possible design, after the integrity of the operating system of the mobile terminal is damaged, a positioning operation can still be performed. A connection between the mobile terminal and a remote server is established based on a user identity credential stored in a first memory. A positioning instruction sent by the remote server is received by using the connection. Geographic location information of the mobile terminal is obtained based on the positioning instruction. The geographic location information is sent to the remote server by using the connection. Certainly, the mobile terminal may alternatively report actively information about a current location to the remote server by using the connection. In this way, after the mobile terminal is lost or stolen, the user can learn of the information about the current location of the mobile terminal in time, and can quickly retrieve the mobile terminal.

In a possible design, the mobile terminal performs integrity verification by performing hash calculation. The mobile terminal further includes a second memory coupled to the application processor. The baseband processor generates a random number, and performs hash calculation by using the random number and a first key stored in the first memory, to generate a first hash value. The baseband processor transfers the random number to the application processor. The application processor performs hash calculation by using the random number and a second key stored in the second memory, to generate a second hash value, and transfers the second hash value to the baseband processor. The baseband processor compares the first hash value with the second hash value, and determines, based on a comparison result, the integrity of the operating system running on the application processor. The first key is the same as the key. The operating system of the mobile terminal usually has a layered design. In an example, an Android system is divided into an application layer, a framework layer, a library layer, and a kernel. Different antitheft modules are arranged at the layers of the Android system. The antitheft modules cooperate with each other and are indispensable. If an antitheft module is damaged, the integrity of the entire operating system is damaged. Integrity verification for the operating system can be implemented at each layer, so that a verification result can be more reliable.

In a possible design, integrity verification is alternatively performed through signature verification. A signature is compared with a previously stored signature credential to verify integrity of all key files (such as applications, system components, and configuration data).

In a possible design, the connection between the mobile terminal and the remote server is a transport layer security (TLS) connection or a Secure Sockets Layer (SSL) connection.

According to another aspect, an embodiment of the present invention provides a mobile terminal. The mobile terminal has a function of implementing the mobile terminal in the foregoing method designs. The function may be implemented by using hardware, or may be implemented by hardware executing corresponding software. The hardware or software includes one or more modules corresponding to the foregoing function. The module may be software and/or hardware.

In a possible design, a structure of the mobile terminal includes a baseband processor, an application processor, and a display. The application processor is configured to: run an operating system, and support the mobile terminal in performing a corresponding function in the foregoing method designs. The baseband processor is configured to support the mobile terminal in performing a corresponding function in the foregoing method designs. The application processor is further configured to control the display to display an SMS message. The mobile terminal may include a first memory. The first memory is configured to be coupled to the baseband processor. The first memory stores a program instruction and data that are necessary for the baseband processor. The mobile terminal may include a second memory. The second memory is configured to be coupled to the application processor. The second memory stores a program instruction and data that are necessary for the application processor.

According to still another aspect, an embodiment of this application provides still another antitheft method for a mobile terminal. The method includes: generating a short message service (SMS) message, where the SMS message is generated when a baseband processor detects that an operating system running on an application processor has no integrity; receiving a notification for the SMS message; detecting that the mobile terminal is being in an unlocked state; detecting that a user has chosen to access a notification center; and displaying the notification center. The notification center includes a pane associated with the notification for the SMS message.

According to still another aspect, an embodiment of this application provides still another mobile terminal. A structure of the mobile terminal includes a baseband processor, an application processor, and a display. The baseband processor is configured to generate a short message service (SMS) message when detecting that an operating system running on an application processor has no integrity. The application processor is configured to: receive a notification for the SMS message; detect that the mobile terminal is being in an unlocked state; detect that a user has chosen to access a notification center; and control the display to display the notification center. The notification center includes a pane associated with the notification for the SMS message.

According to yet another aspect, an embodiment of this application provides still another antitheft method for a mobile terminal. The method includes: generating a short message service (SMS) message, where the SMS message is generated when a baseband processor detects that an operating system running on an application processor has no integrity; receiving a notification for the SMS message; detecting that the mobile terminal is in a locked state; and displaying the notification for the SMS message when the mobile terminal is operating in the locked state.

According to yet another aspect, an embodiment of this application provides still another mobile terminal. A structure of the mobile terminal includes a baseband processor, an application processor, and a display. The baseband processor is configured to generate a short message service (SMS) message when detecting that an operating system running on the application processor has no integrity. The application processor is configured to: receive a notification for the SMS message; detect that the mobile terminal is being in a locked state; and control the display to display the notification for the SMS message when the mobile terminal is operating in the locked state.

According to yet another aspect, an embodiment of the present invention provides a computer storage medium, configured to store a computer software instruction used by the foregoing mobile terminal, where the computer software instruction includes a program designed for executing the foregoing aspects.

Compared with the prior art, the solutions provided in the present invention can improve security of the mobile terminal.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
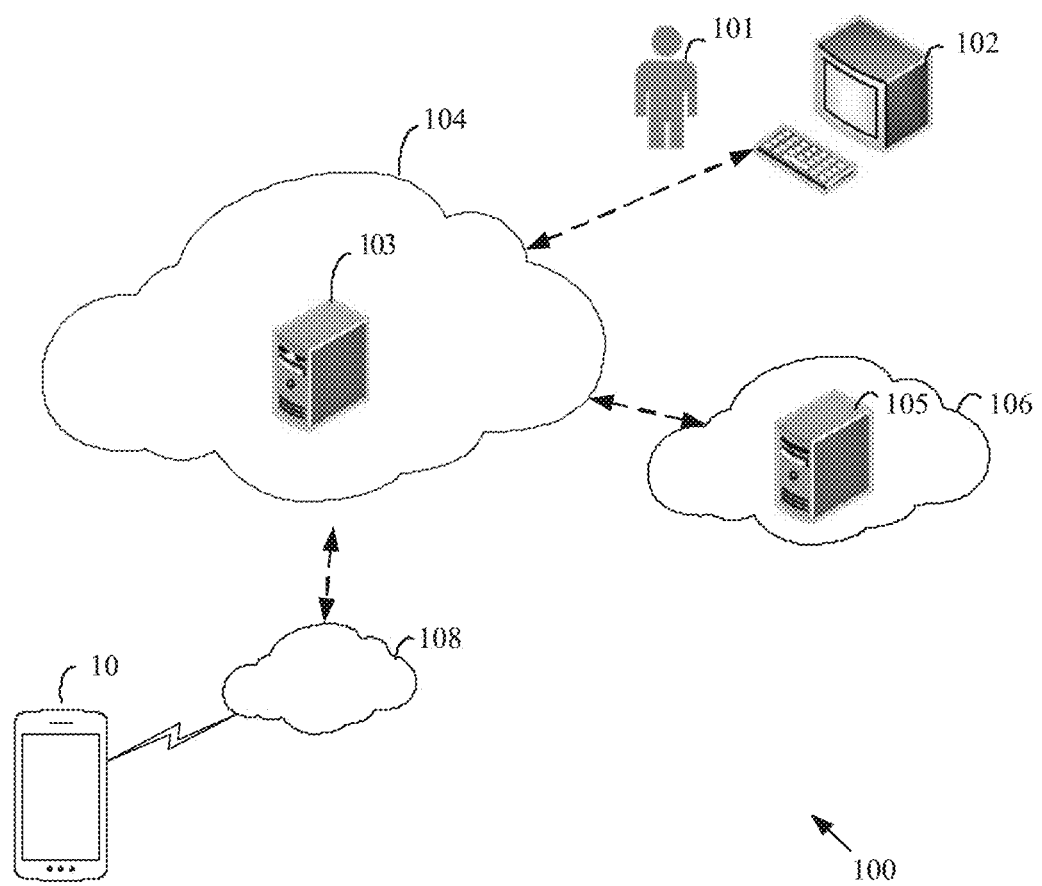
FIG. 1 is a schematic diagram of an example of an antitheft system according to an embodiment of the present invention.

The following clearly and completely describes the technical solutions in the embodiments of the present invention with reference to the accompanying drawings in the embodiments of the present invention. An antitheft method and an apparatus provided in the embodiments of the present invention may be applied to any mobile terminal, such as a cellular phone, a PDA (personal digital assistant), a 2G/3G'4G terminal, or a WLAN (wireless local area network) terminal, and provide services such as asset tracking, asset retrieving, and operating system integrity detection for the foregoing devices. Apparently, the antitheft method and the apparatus provided in the embodiments of the present invention may further be applied to a non-portable computing device (for example, a television or a desktop) and any other electronic apparatus or system that includes a computer and that is configured to ensure safety of electronic or non-electronic assets. For convenience of description, a mobile terminal is used as an example for description in the following embodiments.

In an existing antitheft method for a mobile terminal, usually, antitheft security software is installed on the mobile terminal. After a SIM card in the mobile terminal is changed, the antitheft security software automatically sends an alarm by using an SMS message to a preset specified phone number, to inform a user that the mobile terminal may be stolen, thereby implementing antitheft for the mobile terminal. However, this manner depends on a case in which the antitheft security software on the mobile terminal is not uninstalled. If the antitheft security software on the mobile terminal is manually removed through uninstallation, ROM flashing, or the like, the owner cannot send a notification by using an SMS message to the lost mobile terminal, and antitheft functions such as positioning also become invalid. Therefore, a concept of antitheft for the mobile terminal exactly does not exist. In addition, such antitheft software generally has an operation interface. A thief can know functions of the software after opening the stolen mobile terminal, and may try to delete the software. Therefore, an antitheft effect of the mobile terminal is greatly reduced.

The mobile terminal usually has two or more processors. An application processor is responsible for running an operating system and various application programs (such as an SMS message application and a call application). A baseband processor is responsible for running a special-purpose real-time operating system, controlling network communication of the mobile terminal, and providing a control interface for the application processor. Usually, a network communication function and the special-purpose real-time operating system of the baseband processor cannot be affected by using a method such as software uninstallation or ROM flashing. Therefore, an antitheft security module may run on the baseband processor, so as to implement functions such as prompt, tracking, and retrieving of the mobile terminal when the antitheft security software is uninstalled or when ROM flashing is performed on the mobile terminal.

FIG. 1 is a schematic diagram of an example of an antitheft system according to some embodiments of the present invention. The system includes a plurality of communications networks 104, 106, and 108, a mobile terminal 10, a user 101, a remote server 103 deployed in the communications network 104, and a third-party map server 105 deployed in the communications network 106. The communications networks 104, 106, and 108 may include a 2G/3G/4G mobile communications network, an IP-based communications network such as the Internet, and the like.

A terminal retrieving application is installed on the mobile terminal 10. The terminal retrieving application runs at an application layer of an operating system of the mobile terminal 10, and the operating system of the mobile terminal 10 runs on an application processor. The terminal retrieving application can provide the user with a user interaction interface of an antitheft service. When starting an antitheft function of the terminal retrieving application of the mobile terminal 10, the user 101 needs to register the mobile terminal 10 with the remote server 103 in advance, and preset a login account and password. For a registration process, refer to an account registration process (for example, an account registration process of an application such as QQ, WeChat, or Facebook) in the prior art. An antitheft security module runs on a baseband processor of the mobile terminal 10, and can monitor whether the antitheft security module has been modified in any manner at any time during execution of the terminal retrieving application, so as to implement functions such as prompt, tracking, and retrieving of the mobile terminal when the terminal retrieving application is uninstalled or when ROM flashing is performed on the mobile terminal.

After the mobile terminal 10 is lost, a person who picks up the mobile terminal or a thief can unlock the mobile terminal by using an operation such as ROM flashing on the mobile terminal, to prevent the owner from retrieving the lost or stolen mobile terminal. The owner cannot protect the mobile terminal after the terminal is stolen, causing a property loss. By using the method in the embodiments of the present invention, the original user of the mobile terminal can still log in to the remote server 103 at a client 102 by using the login account and password when the operating system of the mobile terminal is maliciously tampered with or the terminal retrieving application is uninstalled. The user can perform an operation such as positioning or message notification on the mobile terminal 10 by using the client 102, thereby enhancing antitheft security of the mobile terminal 10.

Figure 2:
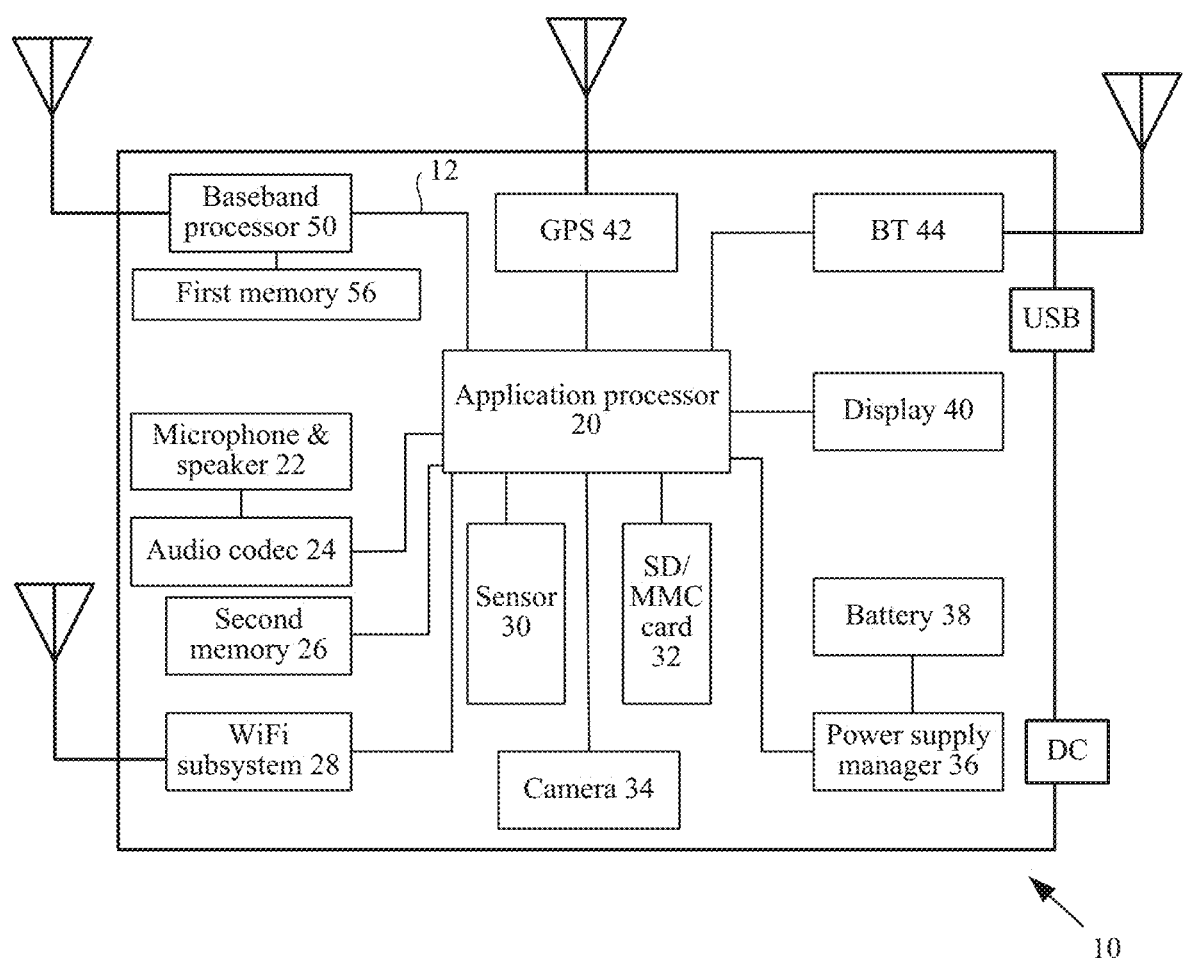
FIG. 2 shows an example of a hardware system architecture of a mobile terminal according to an embodiment of the present invention.

The following separately describes hardware and software system architectures of the mobile terminal 10. Referring to FIG. 2, FIG. 2 shows an example of a hardware system architecture of the mobile terminal 10 according to some embodiments of the present invention. The mobile terminal 10 may include a dual-processor architecture having an application processor (a main processor) 20 and a baseband processor 50. The application processor 20 and the baseband processor 50 may be configured to communicate with each other by using, for example (but not limited to), the following interfaces 12: one or more universal serial bus (USB) interfaces, micro-USB interfaces, universal asynchronous receiver/transmitter (UART) interfaces, and general-purpose input/output (GPIO) interfaces.

The application processor 20 may be responsible for executing various software programs (for example, an application program and a system program), so as to provide calculation and processing operations that are used for the mobile terminal 10. The baseband processor 50 may be responsible for performing various voice and data communication operations that are used for the mobile terminal 10, for example, sending and receiving voice and data information on one or more wireless communications channels. The application processor 20 may also be responsible for performing various voice and data communication operations that are used for the mobile terminal 10. For example, the application processor may be configured to communicate with another wireless device by using a WiFi subsystem 28, or communicate with another device (for example, a server) by using the baseband processor 50 and the wireless wide area network (Wireless Wide Area Network, WWAN) protocol. The WWAN protocol includes the GSM/GPRS protocol, the CDMA protocol, the EDGE protocol, the EV-DO protocol, the EV-DV protocol, the HSDPA protocol, the LTE protocol, and the like.

In various embodiments, the baseband processor 50 can perform analog and/or digital baseband operations that are used for the mobile terminal 10. For example, the baseband processor 50 can perform digital-to-analog conversion (DAC), analog-to-digital conversion (ADC), modulation, demodulation, encoding, decoding, encryption, decryption, and the like. To enable the mobile terminal to support all of network communications standards such as 2G/3G/LTE (Long Term Evolution, Long Term Evolution) of different operators, usually, the baseband processor 50 can support two or more protocol stacks (Protocol Stack). The protocol stack is a sum of protocols at various layers in a network, and is used to vividly reflect a file transmission process in the network. For example, protocols from top to bottom in an Internet protocol stack are an application layer, a transport layer, a network layer, a link layer, and a physical layer.

Although for purposes of illustration, in the embodiments, the dual-processor architecture may be described as including the application processor 20 and the baseband processor 50, the dual-processor architecture of the mobile terminal 10 may further include another processor, and may be implemented as a dual-core or multi-core chip with the application processor 20 and the baseband processor 50 located on a single chip. In other words, the baseband processor 50 and the application processor 20 are disposed on a same integrated circuit chip. Alternatively, the baseband processor 50 and the application processor 20 may be disposed on different integrated circuit chips.

In various embodiments, any proper processor or logic device (for example, a general-purpose processor) may be used to implement the application processor 20 as a main central processing unit (CPU). In an alternate embodiment, the application processor 20 may include (or be implemented as) a chip multiprocessor (CMP), a special-purpose processor, an embedded processor, a media processor, an input/output (I/O) processor, a coprocessor, a field programmable gate array (FPGA), a programmable logic device (PLD), or another processing device. In a particular embodiment, the application processor 20 may be a system-on-chip processor (for example, an ARM7-based processor).

The mobile terminal 10 may include the WiFi subsystem 28 coupled to the application processor 20. In an example of an embodiment, the WiFi subsystem 28 is configured to perform operation and control software of an IEEE802.11n PHY (physical layer) unit and an IEEE802.11n MAC (media access controller) unit, and associated control and operation software. The mobile terminal 10 may further include a GPS air interface 42 and a Bluetooth air interface 44.

In some embodiments, the mobile terminal 10 may further include a user input/output (I/O) device. As shown in the figure, an example of user input/output (I/O) includes a display 40, a microphone and speaker 22, an audio codec 24, and a camera 34. The display 40 may include any proper visual interface that is configured to display content to a user of the mobile terminal 100, such as an LCD, an LED, or an OLED. For example, the display 40 may be implemented by using an LCD such as a touch color (for example, 16-bit color) thin film transistor (TFT) LCD. Other peripheral apparatuses may include an external media interface 32 (for example, an SD/MMC card interface), a sensor 30, and/or the like.

A battery 38 is configured to provide power that is for performing an operation on the mobile terminal 10. A power supply manager 36 is coupled to the battery 38. The power supply manager 36 monitors a voltage of the battery 38, and provides battery information for the application processor 20. The battery information may be a battery voltage, power stored in the battery, battery power consumption, or a current consumption rate.

The mobile terminal 10 may include a first memory 56 coupled to the baseband processor 50. The first memory 56 may be implemented by using one or more types of machine-readable media or computer-readable media that can store data, for example, a non-volatile memory, a removable memory or a non-removable memory, an erasable memory or a non-erasable memory, or a writable or rewritable memory. For example, the first memory 56 may include a flash memory. Although for purposes of illustration, as shown in the figure, the first memory 56 is separate from the baseband processor 50, and is located outside the baseband processor 50, in various embodiments, a part of the first memory 56 or the entire first memory 56 may be integrated on a same integrated circuit as the baseband processor 50.

The mobile terminal 10 may include a second memory 26 coupled to the application processor 20. In various embodiments, the second memory 26 may be configured to store one or more software programs executed by the application processor 20. The second memory 26 may be implemented by using any machine-readable medium or computer-readable medium that can store data, for example (but not limited to), a non-volatile memory, a removable memory or a non-removable memory, an erasable memory or a non-erasable memory, or a writable or rewritable memory. An example of the machine-readable medium may include, but is not limited to: a read-only memory (ROM), a programmable ROM (PROM), an erasable programmable ROM (EPROM), an electrically erasable programmable ROM (EEPROM), a flash memory (for example, a NOR or NAND flash memory), or any other type of medium that is suitable to store information.

Although for purposes of illustration, as shown in the figure, the second memory 26 is separate from the application processor 20, in various embodiments, a part of the second memory 26 or the entire second memory 26 may be integrated on a same integrated circuit as the application processor 20. Alternatively, a part of the second memory 26 or the entire second memory 26 may be arranged on an integrated circuit that is different from an integrated circuit of the application processor 20 or on another medium (for example, a hard disk drive).

In various embodiments, the first memory 56 may be configured to store one or more programs executed by the baseband processor 50 and data to be accessed by the baseband processor 50. A security agent (namely, the anti-theft security module mentioned above) and an SMS message simulation module are configured in the first memory 56. The security agent and the SMS message simulation module are software modules executed by the baseband processor of the mobile terminal 10. The security agent is mainly responsible for functions such as system integrity verification and location tracking and reporting of the mobile terminal 10 and network communication with the remote server 103. The SMS message simulation module is mainly responsible for generating a short message service (SMS) message and transferring the SMS message to an SMS message application at the application layer of the operating system of the mobile terminal 10. The SMS message application presents the SMS message to the user by using the display 40.

The first memory 56 further stores a user identity credential that is a credential for the user to log in to the remote server 103. The user identity credential may be an encrypted service token (ServiceToken), an encrypted international mobile equipment identity (IMEI), an encrypted user account and password, or the like. A service token obtaining process is as follows: By using the terminal retrieving application of the mobile terminal 10, the user registers a user account with the remote server 103 in advance and presets a password. The user logs in to the user account on the mobile terminal 10. The mobile terminal 10 sends the user account and the password to the remote server 103 (FIG. 1). The remote server 103 verifies the user account and the password, informs the mobile terminal 10 of a successful login after the verification succeeds, and sends a service token to the mobile terminal 10.

Figure 3:
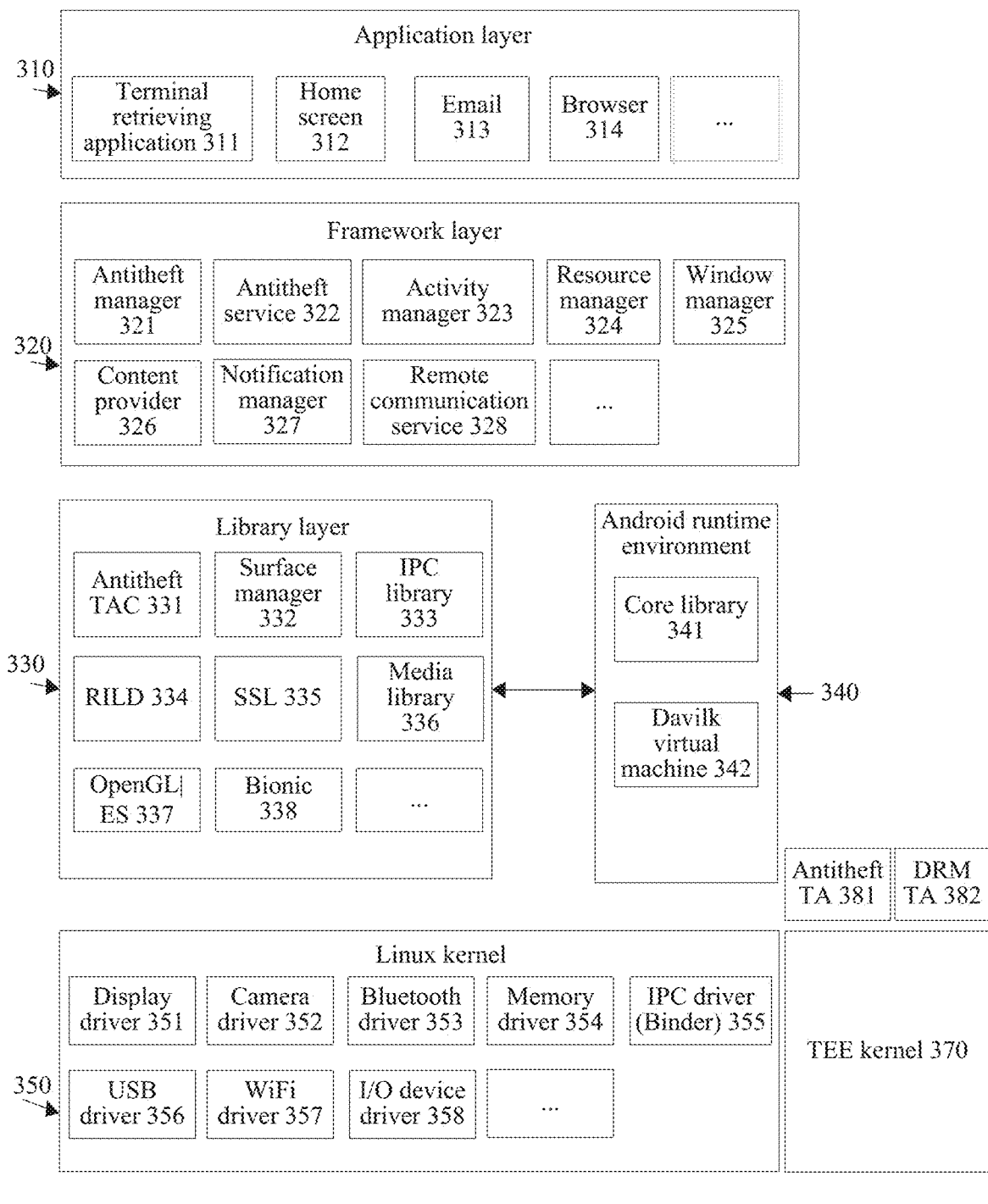
FIG. 3 shows an Android OS architecture of a mobile terminal according to an embodiment of the present invention.

The following describes a software system architecture of the mobile terminal 10. Referring to FIG. 3, FIG. 3 shows an architecture 300 of an Android OS that can be used for running on an application processor 20 (FIG. 2) of the mobile terminal 10. The Android OS may be a modified Android distribution (distribution), that is, a third-party Android OS developed and formulated by a third party based on an original Android OS. The embodiments of the present invention may be applicable to a mobile terminal based on an open operating system (Operating System, OS). The open OS includes, but is not limited to, a Linux OS and the Android OS. Particularly, preferred embodiments of the present invention described based on the Android OS are only for purposes of illustration, and shall not be construed as a limit to the intended scope of the present invention.

The Android OS has a library layer, a framework layer, and an application layer. In the Android OS 300, applications 311, 312, and the like run at the application layer 310 supported by the framework layer 320 of the Android OS 300. The application layer 310 includes a terminal retrieving application 311, a home screen 312, an email application 313, a browser application 314, and/or one or more other applications.

The framework layer 320 includes one or more managers and one or more services that are used for an application running on the Android OS 200. For example, components of the framework layer 320 include an antitheft manager 321, an antitheft service 322, an activity manager 323, a resource manager 324, a window manager 325, a content provider 326, a notification manager 327, and a remote communication service 328. Other components that may be included in the framework layer 320 of the Android OS 300 further include a telephony manager, a packet manager, a location manager, and/or other managers and services. The framework layer 320 may include a mobile application runtime environment that executes an application developed for a mobile OS 130. The mobile application runtime environment may be optimized for a mobile computing resource such as a relatively low processing capability or limited memory space.

The library layer 330 includes a user library 332 (a "standard C library") that implements a common function such as I/O, a graphics library, a database library, a communications library, and/or other libraries. The library layer 330 includes a "Bionic" system C library 338 specially developed for Android. The library layer 330 further includes an inter-process communication ("IPC") library 333, and the IPC library 333 includes a base class of a "binder (Binder)" IPC mechanism used for the Android OS. A binder is specially developed for Android, so that communication between a process and a service is allowed. Other libraries at the library layer 330 in FIG. 3 include a media library 336 that supports recording and playback of a media format, a surface manager 332 that manages access to a display subsystem and composites graphic layers from a plurality of applications, a 2D and 3D graphics engine 337, a secure communications library SSL 335, a radio interface layer daemon (Radio Interface Layer Daemon, RILD) 334, and the like.

The applications at the application layer 310 run on a Dalvik virtual machine 342 in an Android runtime environment 340 on an Android object-oriented application framework. The Dalvik virtual machine 342 is a register-based virtual machine, and runs a compact executable format that is designed to reduce memory usage and processing requirements. The Android runtime environment 340 further includes a core library 341. Optionally, the Android OS 300 may replace the Dalvik virtual machine with Android Runtime (ART) having a latest release, so as to improve running efficiency of an application program.

A kernel 350 may include various device drivers such as a display driver 351, a camera driver 352, a Bluetooth driver 353, a memory driver 354, an inter-process communication (IPC) driver 355, a USB driver 356, a WiFi driver 357, and an I/O device driver 358.

The Android OS is a multifunctional operating system. Usually, the Android OS further includes a trusted execution environment (Trusted Execution Environment, TEE), responsible for providing a security service. The TEE has its own execution space and provides a higher security level. The TEE may use a trusted platform module (Trusted Platform Module. TPM) or an ARM TrustZone security technology. The TEE provides a secure execution environment for authorized security software (trusted application, TA), and also protects resource and data secrecy, integrity, and access permission of the TA. As shown in FIG. 3, the TEE of the mobile terminal 10 includes a TEE kernel 370, an antitheft TA 381, a digital rights management TA 382, and the like. The antitheft TA is responsible for implementing antitheft configuration data storage and deletion operations and communicating with another module that is related to an antitheft operation. In addition, the application processor 20 (FIG. 2) may also be configured to run in the trusted execution environment.

A security agent is arranged in a first memory 56 (FIG. 2) of the mobile terminal 10. Different antitheft modules (such as the terminal retrieving application 311, the antitheft manager 321, the antitheft service 322, an antitheft TAC 331, and the antitheft TA 381) are arranged at the application layer, the framework layer, and the library layer and in the TEE of the Android operating system of the mobile terminal 10. The security agent may cooperate with the foregoing antitheft modules to perform operations, and monitor integrity of the operating system loaded to the mobile terminal 10, so as to determine whether the foregoing modules have been modified in any manner at any time during execution of one or more application programs (for example, dynamic tampering implemented by using a debugger).

In an embodiment of the present invention, integrity verification can be performed by performing hash calculation, so as to protect an executable file and other data from being tampered with. For example, hash calculation may be performed for all key files (such as applications, system components, and configuration data). Such hash may include verification derived by using any hash function known in the art. When the mobile terminal 10 is powered on, the security agent generates a random number, recalculates a hash value of an application or a system component, and compares the hash value with a previously stored value. If the comparison succeeds, it indicates that the component has not been modified by an attacker. However, if the calculated value is different from the previously stored value, it indicates that the system component has been modified, and cannot be trusted any longer for performing a function that is intended to be performed.

Optionally, a baseband processor 50 generates a random number, and performs hash calculation by using the random number and a first key stored in the first memory 56, to generate a first hash value. The baseband processor transfers the random number to the application processor 20. The application processor 20 performs hash calculation by using the random number and a second key stored in a second memory 26, to generate a second hash value, and transfers the second hash value to the baseband processor 50. The baseband processor 50 compares the first hash value with the second hash value, and determines, based on a comparison result, integrity of the operating system running on the application processor 20. The first key is the same as the second key.

Figure 4:
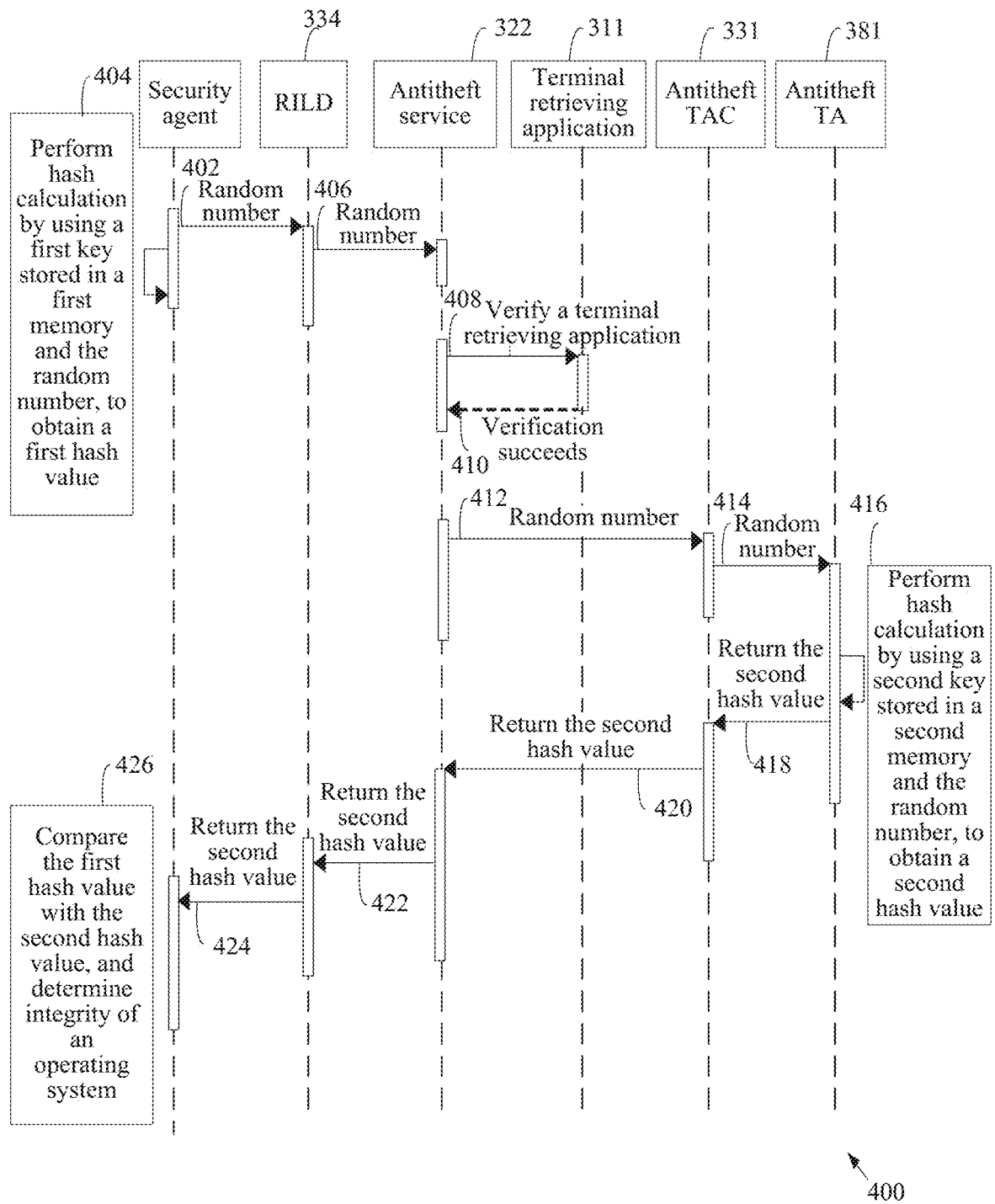
FIG. 4 shows a communication flow of verifying integrity of an operating system according to an embodiment of the present invention.

FIG. 4 shows a communication flow 400 of verifying integrity of an operating system according to an embodiment of the present invention.

In step 402, after the mobile terminal 10 is powered on, the security agent generates a random number and transfers the random number to the RILD 334.

In step 404, the security agent performs hash calculation by using a first key stored in the first memory 56 (FIG. 2) and the random number, to generate a first hash value.

In step 406, the RILD 334 transfers the random number to the antitheft service 322.

In step 408, the antitheft service 322 verifies integrity of the terminal retrieving application 311. Specifically, the antitheft service 322 transfers a signature credential stored in the second memory 26 to the terminal retrieving application 311. The terminal retrieving application 311 compares the signature credential with a signature in the terminal retrieving application 311, to verify the integrity of the terminal retrieving application 311.

In step 410, if the verification in step 408 succeeds, the terminal retrieving application 311 returns a verification success flag to the antitheft service 322. If the verification in step 408 fails, it indicates that the terminal retrieving application 311 has been tampered with, and the integrity verification procedure ends.

In step 412, the antitheft service 322 transfers the random number to the antitheft TAC 331.

In step 414, the antitheft TAC 331 transfers the random number to the antitheft TA 381.

In step 416, the antitheft TA 381 performs hash calculation by using the random number and a second key stored in the second memory 26 (FIG. 2), to generate a second hash value. The first key is the same as the second key.

In step 418, the antitheft TA 381 returns the second hash value to the antitheft TAC 331.

In step 420, the antitheft TAC 331 returns the second hash value to the antitheft service 322.

In step 422, the antitheft service 322 returns the second hash value to the RILD 334.

In step 424, the RILD 334 returns the second hash value to the security agent.

In step 426, the security agent compares the first hash value with the received second hash value. If the two values are the same, it indicates that the operating system has integrity, and has not been modified by an attacker.

In FIG. 4, the modules including the security agent, the RILD 334, the antitheft service 322, the terminal retrieving application 311, the antitheft TAC 331, and the antitheft TA cooperate with each other, to implement a function of verifying the integrity of the operating system together. If one of the modules (such as the RILD 334, the antitheft service 322, the terminal retrieving application 311, the antitheft TAC 331, or the antitheft TA) has been modified, and cannot be trusted any longer for performing a function that is intended to be performed, the communication flow in FIG. 4 is interrupted, and the security agent determines that the operating system has no integrity. For example, after the antitheft service 322 is tampered with, the antitheft service 322 cannot verify the terminal retrieving application 311, and cannot transfer the random number to the antitheft TAC 331 either. In this case, step 408 to step 426 cannot be performed. Therefore, the security agent determines that the operating system has no integrity. The integrity of the operating system can be well verified by arranging antitheft modules (such as the antitheft manager 321, the antitheft service 322, the antitheft TAC 331, and the antitheft TA 381) at each layer (the application layer, the framework layer, and the library layer) and in the TEE of the operating system, thereby obtaining a reliable integrity verification result.

In another embodiment of the present invention, integrity verification is performed through signature verification. The security agent compares a signature with a previously stored signature credential to verify integrity of all key files (such as applications, system components, and configuration data). Integrity verification of the RILD 334 is used as an example. The first memory 56 (FIG. 2) stores a signature credential of the RILD 334. The security agent obtains a signature in the RILD 334. If a value of the signature is the same as that of the signature credential stored in the first memory 56, the security agent determines that the RILD 334 has not been modified by an attacker, and permission or a privilege of the RILD 334 has not been modified. However, if the value of the signature is different from that of the stored signature credential, the security agent determines that the RILD 334 has been modified, and cannot be trusted any longer for performing a function that is intended to be performed. For other antitheft modules (for example, the antitheft manager 321, the antitheft service 322, the antitheft TAC 331, and the antitheft TA 381) in the system, a similar signature verification method may also be used.

When detecting that the operating system running on the application processor 20 has no integrity, the baseband processor 50 triggers the antitheft method in the embodiments of the present invention, that is, the foregoing operation such as positioning or message notification performed on the mobile terminal 10.

Still using the example of the antitheft system architecture shown in FIG. 1 as an example, a TCP/IP protocol stack is embedded in the baseband processor 50. When the baseband processor 50 detects that the operating system running on the application processor 20 has no integrity, the mobile terminal 10 establishes a first TCP/IP connection to the remote server 103 through the communications network 108 and the communications network 104 in FIG. 1 by using the user identity credential stored in the first memory 56 and address information (for example, an IP address or a domain name) of the remote server 103, so as to transmit the geographic location information of the mobile terminal 10 and a message notification through point-to-point IP routing.

Figure 5:
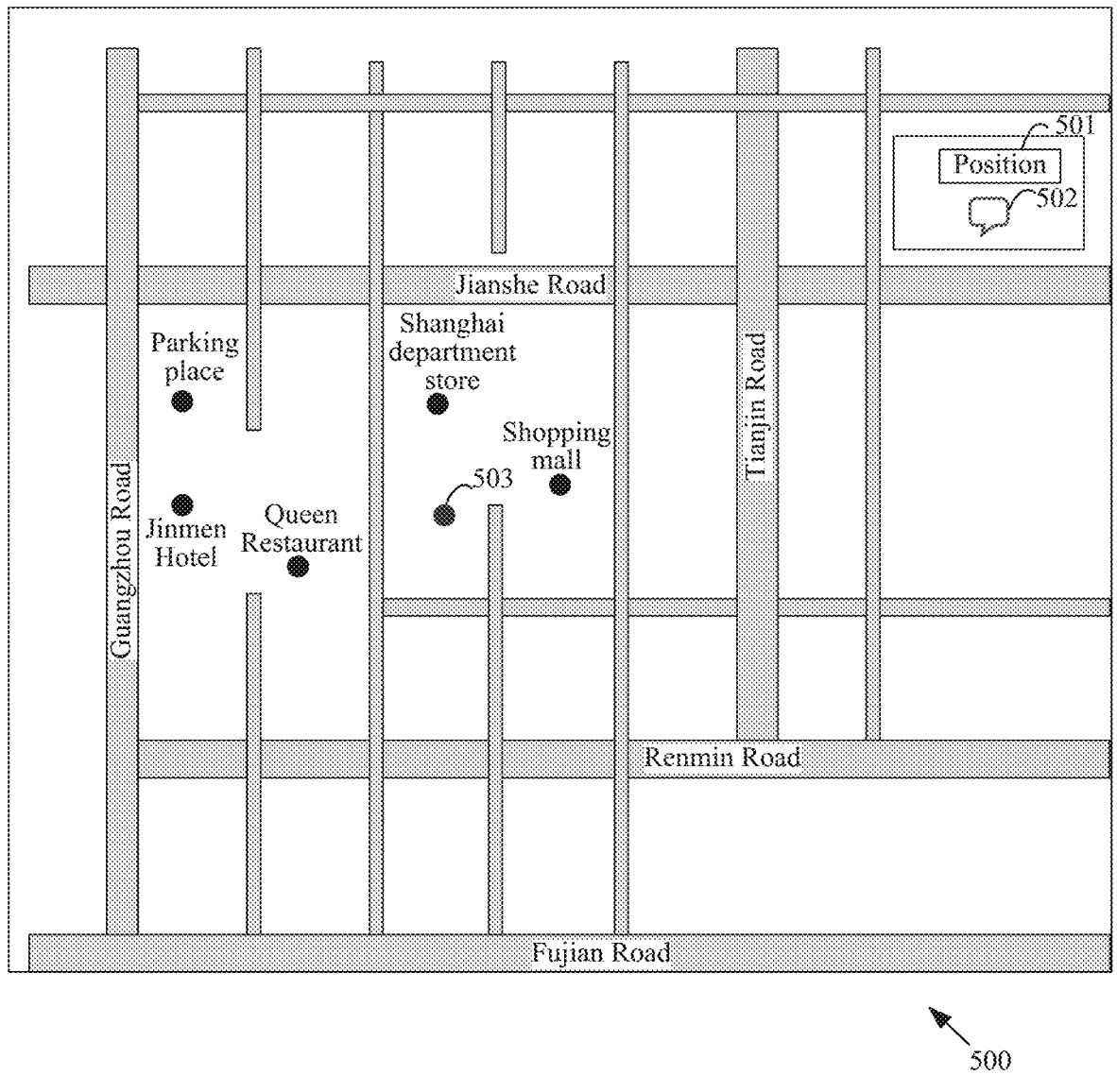
FIG. 5 shows a user interface for a user to log in to a remote server according to an embodiment of the present invention.

The user 101 also logs in to the remote server 103 at the client 102 by using the login account and the password of the terminal retrieving application mentioned above, and establishes a second TCP/IP connection to the remote server 103. The client 102 presents a user interface 500 shown in FIG. 5 to the user 101. The user interface 500 may be a web page or a program interface. The user 101 can perform an operation such as positioning or message notification by using the user interface 500. The operation performed by the user 101 by using the user interface 500 is transferred to the mobile terminal 10 by using the remote server 103.

The user 101 may tap an object 502 to input text content and transfer the text content to the remote server 103 by using the second TCP/IP connection. If the remote server 103 has established a first TCP/IP connection to the mobile terminal 10, the remote server 103 sends the text content to the mobile terminal 10 by using the first TCP/IP connection. If the remote server 103 has not established a first TCP/IP connection to the mobile terminal 10 (for example, the mobile terminal 10 is not online), the remote server 103 temporarily stores the text content transferred by the user 101 by using the client 102, and sends the stored text content to the mobile terminal 10 after the mobile terminal 10 establishes the first TCP/IP connection to the remote server 103. After receiving the text content, the mobile terminal 10 encodes the text content by using a short message service (SMS) message encoding format, to generate an SMS message, and presents the SMS message by invoking an SMS application of the mobile terminal 10. An SMS is a service commonly supported by mobile apparatuses, and is used to transmit an SMS message between these mobile apparatuses. A conventional SMS is provided by an operator of a wireless communications network. The SMS allows a user to send a text message to another user in the communications network (for example, a cellular network), and to receive a text message from another user. The mobile terminal needs to have a subscriber identity module (SIM). In the embodiments of the present invention, no SMS service provided by the conventional operator needs to be used, and by using the second TCP/IP connection, the user 101 can transmit the text content to the mobile terminal 10 by using the remote server 103.

In the prior art, after a mobile terminal is lost, a person who picks up the mobile terminal or a thief usually changes a SIM card, and an owner usually cannot know a phone number of a changed SIM card, and consequently, cannot contact the person who picks up the mobile terminal or the thief by using a call or an SMS message. In the embodiments of the present invention, because the first memory 56 of the mobile terminal 10 stores the user identity credential, the mobile terminal 10 can establish a connection to the remote server 103, and transmit the geographic location information of the mobile terminal 10 and a message notification. Therefore, even though the integrity of the operating system is damaged and the SIM card is changed after the mobile terminal 10 is lost, the user 101 can still retrieve the lost device by using the remote server 103.

Figure 6:
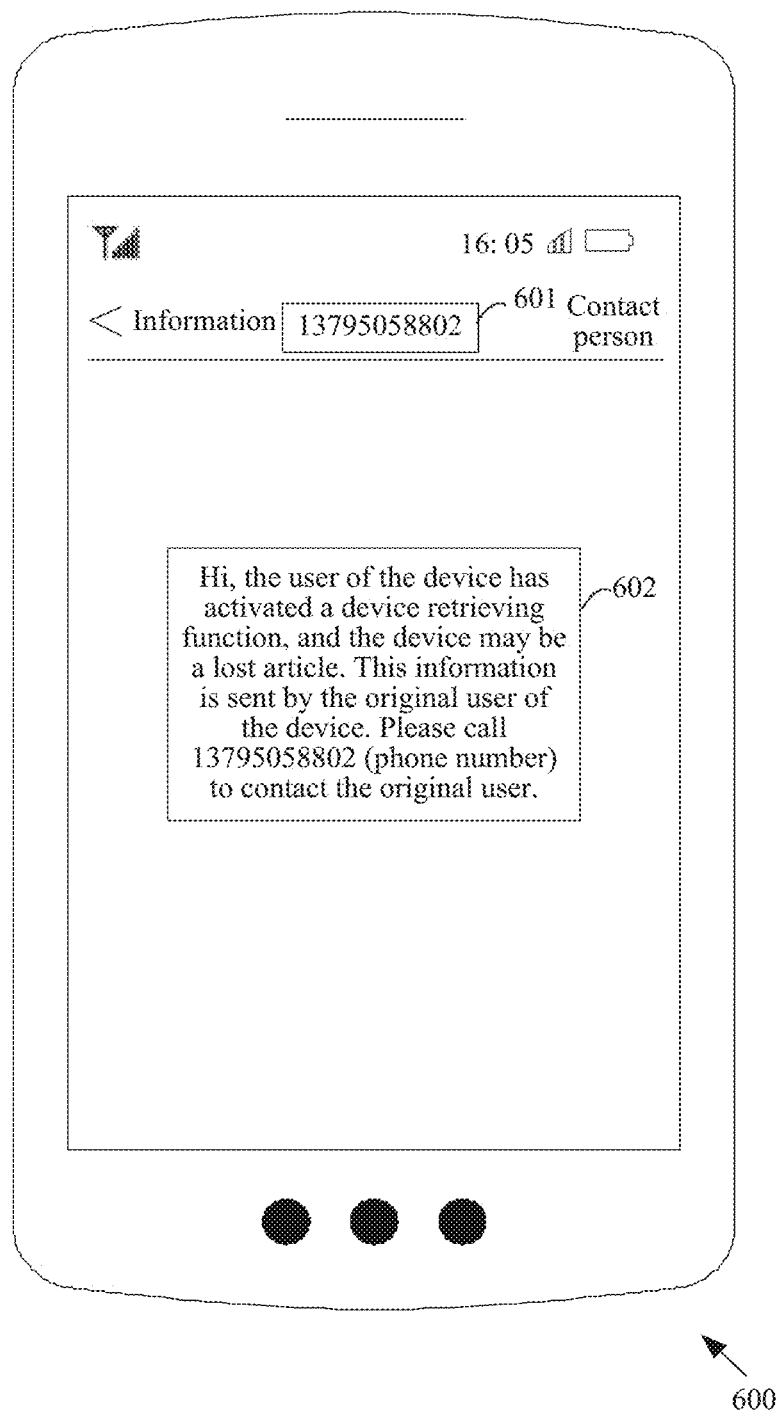
FIG. 6 shows an example of an interface on which a mobile terminal presents an SMS message according to an embodiment of the present invention.

FIG. 6 shows an example of an interface on which the mobile terminal 10 presents an SMS message 602. The interface includes a phone number 601 of an original user of the mobile terminal 10. When a thief views the SMS message 602, the thief is worried about identity leakage, and may contact the original user of the mobile terminal 10 by using the phone number 601 of the original user in the SMS message 602, and return the mobile terminal 10 in time. The SMS message may be stored in an inbox of an SMS message application of the mobile terminal 10, so as to be presented later.

Figure 7:
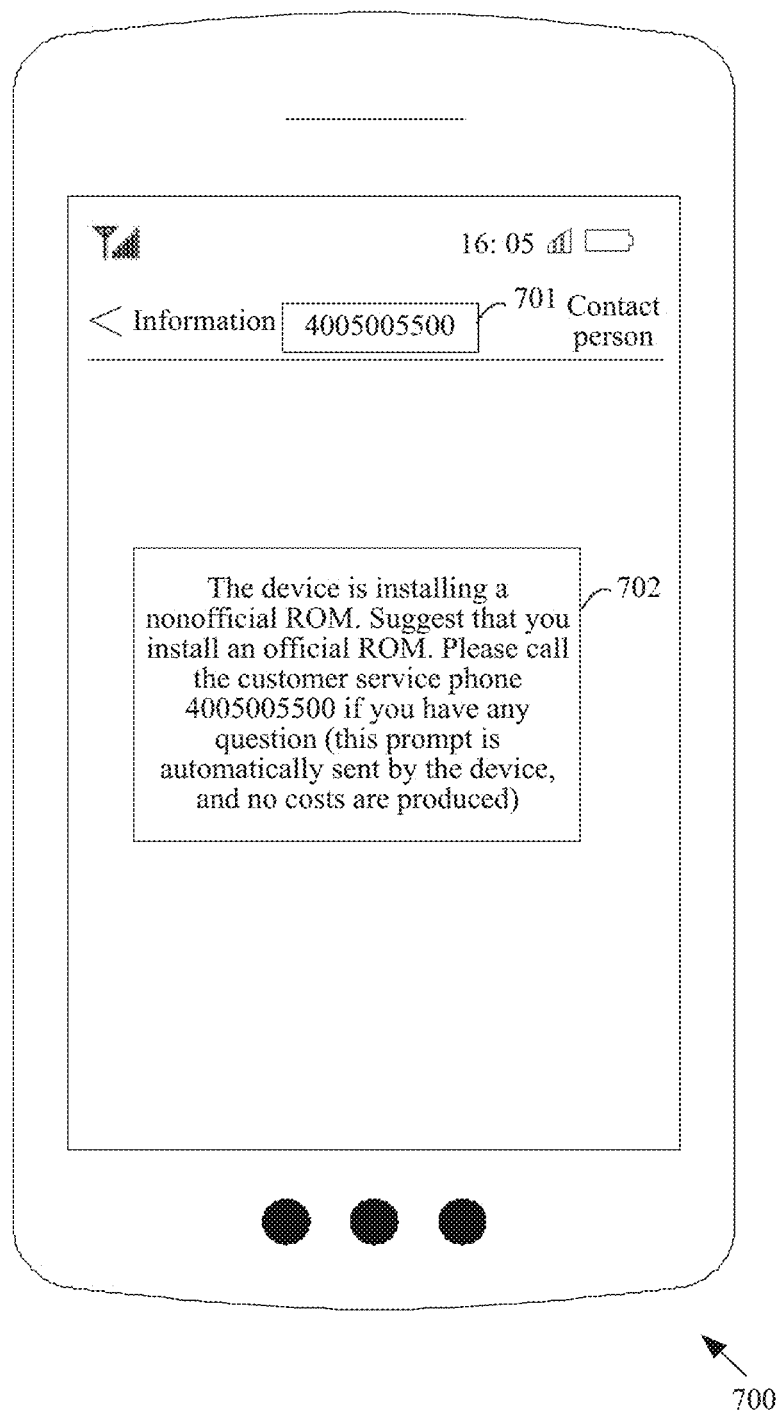
FIG. 7 shows an example of an interface on which a mobile terminal presents an SMS message according to another embodiment of the present invention.

In another embodiment of the present invention, the mobile terminal 10 has an operating system tampering prompt function. When the security agent detects that the operating system has no integrity, the SMS message simulation module encodes, by using an SMS message encoding format, particular content stored in the first memory 56, to generate an SMS message; and simulates an existing SMS message receiving procedure, to finally present the SMS message including the particular content to the SMS application of the mobile terminal 10. As shown in FIG. 7, when the security agent detects that the operating system has no integrity, the mobile terminal 10 presents an SMS message 702 to the user. Content of the SMS message 702 is generated by a manufacturer of the mobile terminal 10 by using particular content preset in the first memory. The SMS message 702 is used to inform the user that a nonofficial ROM is installed (that is, the operating system is tampered with). The user may call a contact phone number 701 to consult customer service personnel of the manufacturer of the mobile terminal 10.

In still another embodiment of the present invention, the user of the mobile terminal 10 may install a third-party operating system. Because ROM flashing is performed by the user of the mobile terminal 10, and the mobile terminal 10 is not lost, the user does not expect to receive an operating system tampering prompt message in FIG. 7. The first memory 56 of the mobile terminal 10 may store a SIM card identifier of the user. The SIM card identifier includes identification information such as an international mobile subscriber identity (International mobile subscriber identity, IMSI) or an integrated circuit card identity (Integrated circuit card identity, ICCID) in a SIM card. When detecting that the operating system has no integrity, the security agent detects a current SIM card identifier of the mobile terminal 10, compares the current SIM card identifier with the stored SIM card identifier, and if the current SIM card identifier is the same as the stored SIM card identifier, does not inform the user that the operating system has been tampered with. When installing the third-party operating system, the user of the mobile terminal 10 usually does not change the SIM card.

Figure 8:
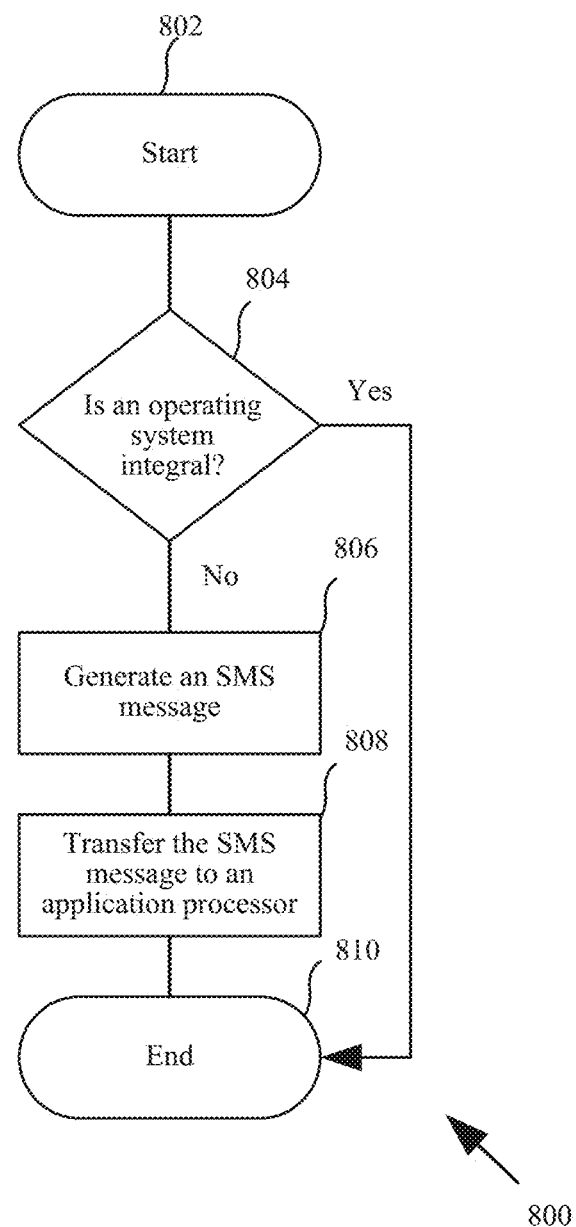
FIG. 8 is a flowchart of an antitheft method according to an embodiment of the present invention.

FIG. 8 is a flowchart of an antitheft method according to some embodiments of the present invention. The procedure starts from step 802. In step 804, the baseband processor 50 may detect, by using the specific detection method in FIG. 4, integrity of the operating system running on the application processor 20. When the baseband processor 50 detects that the operating system has no integrity, proceed to step 806; otherwise, proceed to step 810. In step 806, the baseband processor 50 generates an SMS message, and in step 808, transfers the SMS message to the application processor 20. Then, the application processor 20 controls the display 40 to display the SMS message, and to finally present the SMS message shown in FIG. 6 and FIG. 7 to the user. The generated SMS message is used to inform that the operating system has no integrity.

FIG. 6 and FIG. 7 represent two situations in which the baseband processor 50 generates the SMS message.

In a first situation, when detecting that the operating system has no integrity, the security agent establishes, based on a user identity credential stored in the first memory 56, a connection between the mobile terminal 10 and the remote server 103, where the connection is a transport layer security (TLS) connection or a Secure Sockets Layer (SSL) connection; receives, by using the connection, a first message sent by the remote server 103; encodes the first message by using an SMS message encoding format, to generate an SMS message; and simulates an existing SMS message receiving procedure, to finally present the SMS message to the SMS application of the mobile terminal 10. It should be noted that content stored in a memory unit (not shown) of the remote server 103 in FIG. 1 includes a set of data that is of one or more users 101 and that is managed by the remote server 103, for example, a user identity credential of the user 101 or a device identifier of the user, for verifying an identity of the user.

In a second situation, when the security agent detects that the operating system has no integrity, the baseband processor 50 encodes, by using an SMS message encoding format, particular content stored in the first memory 56, to generate an SMS message; and simulates an existing SMS message receiving procedure, to finally present the SMS message including the particular content to the SMS application of the mobile terminal 10.

The SMS message simulation module is mainly responsible for generating an SMS message and transferring the SMS message to the application processor 20. Specifically, when the baseband processor 50 detects that the operating system on the application processor 20 has no integrity, the SMS message simulation module generates an SMS message and transfers the SMS message to the application processor 20. An SMS is a storage and forwarding system. All messages sent and received by a mobile phone need to be processed in an SMS message service center (SMSC). If both a receiver and a sender are managed and controlled by a same SMSC, after receiving an SMS message, the SMSC directly transfers the message to the receiver. If the receiver and the sender are managed and controlled by different SMSCs, after receiving an SMS message, an SMSC forwards the SMS message to the other SMSC.

The SMS message includes two formats: SMS_SUBMIT and SMS_DELIVER. The SMS_SUBMIT format is applicable to sending a message to an SMSC by a mobile phone, and the SMS_DELIVER format is applicable to sending a message to a mobile phone by an SMSC. The SMSSMS_DELIVER message format is shown in Table 1.

TABLE 1

| Name | Quantity of bytes | Meaning |
| --- | --- | --- |
| SCA | 1-12 | SMSC address |
| PDUType | 1 | Message type |
| OA | 2-12 | Sender address |
| PID | 1 | Protocol identifier |
| DCS | 1 | Data encoding scheme |
| SCTS | 7 | Service center timestamp |
| UDL | 1 | User data length |
| UD | 0-140 | User data |

Figure 9:
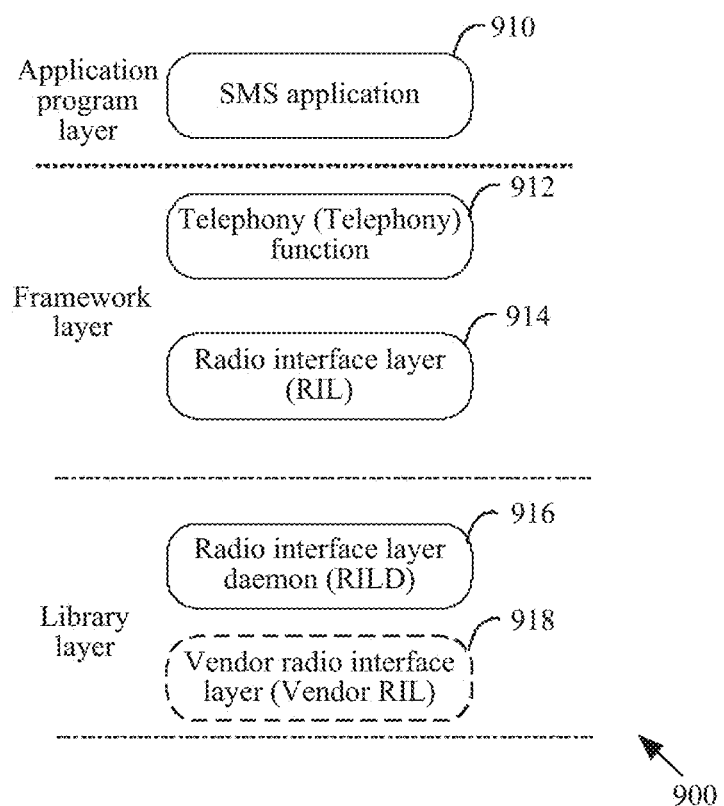
FIG. 9 is a block diagram of SMS functions in an Android OS according to an embodiment of the present invention.

FIG. 9 is a block diagram of SMS functions in an Android OS. The SMS functions from top to bottom are an application program layer, a framework layer, and a library layer. The application program layer mainly provides an SMS application 910, to provide a user with a user interface of receiving and sending SMS messages. At the framework layer, a telephony (Telephony) function 912 provides a telephony service for a telephony application (for example, a dialing application or the SMS application) at the application program layer, for example, initiates a phone call by receiving a called number. The telephony function 912 interacts with a radio interface layer (Radio Interface Layer, RIL) 914. The RIL provides an interface layer between a telephony service and a radio baseband. An Android RIL is divided into two parts: One is a radio interface layer daemon (RIL Daemon, RILD) 916, responsible for communicating with the framework layer by using a socket, and the other is a vendor radio interface layer (Vendor RIL) 918, responsible for communicating with the radio baseband. The RIL is responsible for reliable data transmission, AT command sending, and response message parsing.

The application processor 20 communicates with the baseband processor 50 by using an AT command set. A communication manner is further divided into a proactive request (such as dialing or sending an SMS message) and unsolicited AT command result codes (unsolicited AT command result codes) proactively reported by the baseband processor 50, such as a signal strength, base station information, an incoming call, and an incoming SMS message. The result codes include two rows of ASCII codes. A first row includes the result codes and a quantity of bytes of data in a second row, and the data in the second row is hexadecimal SMS message content.

The SMS message simulation module is responsible for constructing unsolicited AT command result codes to simulate an SMS message receiving process, and transferring the result codes to the application processor 20, and then to the SMS application 910 by using the library layer and the framework layer.

In the embodiments of the present invention, a conventional SMS service provided by an operator of a wireless communications network does not need to be used, and an SMS service can be simulated only by using software, thereby saving an SMS message fee of a user. In addition, in the conventional SMS, a sender needs to know a phone number of a receiver, and then can send an SMS message by using the wireless communications network of the operator. In the embodiments of the present invention, when the operating system of the mobile terminal 10 is illegally tampered with, the user identity credential stored in the first memory 56 can be used to: establish a connection to the remote server 103, and receive a message that includes customized content and that is delivered by the user 101 by using the client 102, and present an SMS message having same content to the user. The message having the customized content may include a phone number of the user 101. In this way, after the mobile terminal 10 is lost and is owned by an unscrupulous person, the mobile terminal 10 can still receive an SMS message in which a sender is displayed as the phone number of the user 101. A behavior of the unscrupulous person is exposed. The unscrupulous person is more willing to return the mobile terminal 10 to the user 101, thereby enhancing security of the mobile terminal 10.

In some implementations, when the operating system of the mobile terminal 10 is illegally tampered with, after the user identity credential stored in the first memory 56 is used to establish the connection to the remote server 103, through the SMS message application, a notification message can be sent to the client 102 by using the connection, and the notification message can be presented to the user 101 of the client 102. In some other implementations, when the operating system of the mobile terminal 10 is illegally tampered with, after the user identity credential stored in the first memory 56 is used to establish the connection to the remote server 103, the client 102 (such as a mobile phone or a tablet computer having a call function) of the user 101 can be called by using the telephony application of the mobile terminal 10. The user 101 can also initiate a call to the mobile terminal 10 by using the client 102.

Figure 10:
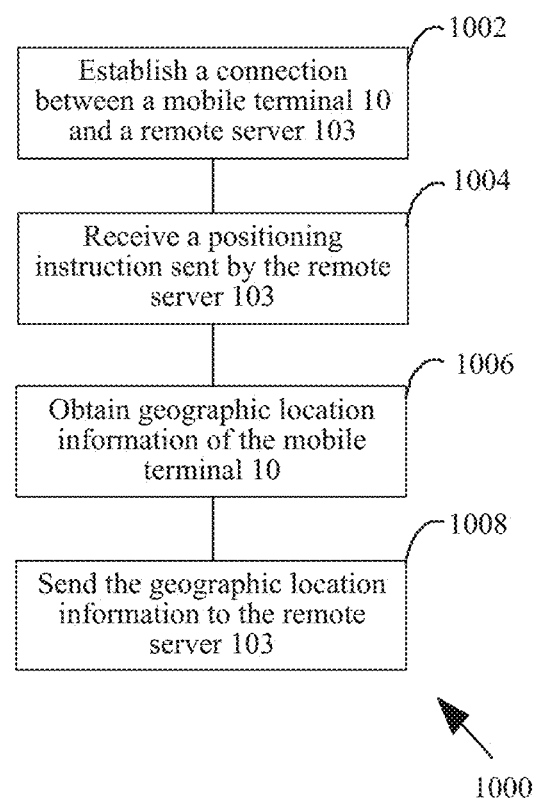
FIG. 10 is a flowchart of a remote positioning method according to an embodiment of the present invention.

FIG. 10 is a remote positioning flowchart according to some embodiments of the present invention. As described above, when detecting that the operating system has no integrity, after the security agent establishes, based on a user identity credential stored in the first memory 56, a connection between the mobile terminal 10 and the remote server 103 (step 1002), the security agent receives, by using the connection, a positioning instruction sent by the remote server 103 (step 1004), obtains geographic location information of the mobile terminal 10 based on the positioning instruction (step 1006), and sends the geographic location information to the remote server by using the connection (step 1008).

The geographic location information of the mobile terminal 10 may be obtained by using a GPS positioning technology, a WiFi positioning technology, a base station positioning technology, or another positioning technology. This is not limited in the embodiments of the present invention. GPS positioning is implemented based on a GPS navigational satellite. WiFi positioning is implemented by a WiFi hardware module by scanning and collecting AP information, sending the AP information to a positioning server, and receiving location information that is from the positioning server. Base station positioning is similar to the WiFi positioning. A 2G/3G/4G hardware module sends received base station information to a positioning server, so that the positioning server completes positioning; and then receives location information sent by the positioning server. A terminal can also implement positioning by using an inertial navigation technology. That is, speed information of the terminal at every moment in a movement process of the terminal is obtained by using an acceleration sensor and a gyroscope on the terminal, and then a current location of the terminal is deduced when a movement start point is known.

Optionally, when the security agent detects that the operating system has no integrity, the mobile terminal 10 may proactively report current location information to the remote server 103. In this case, step 1004 in FIG. 10 can be omitted.

Figure 11:
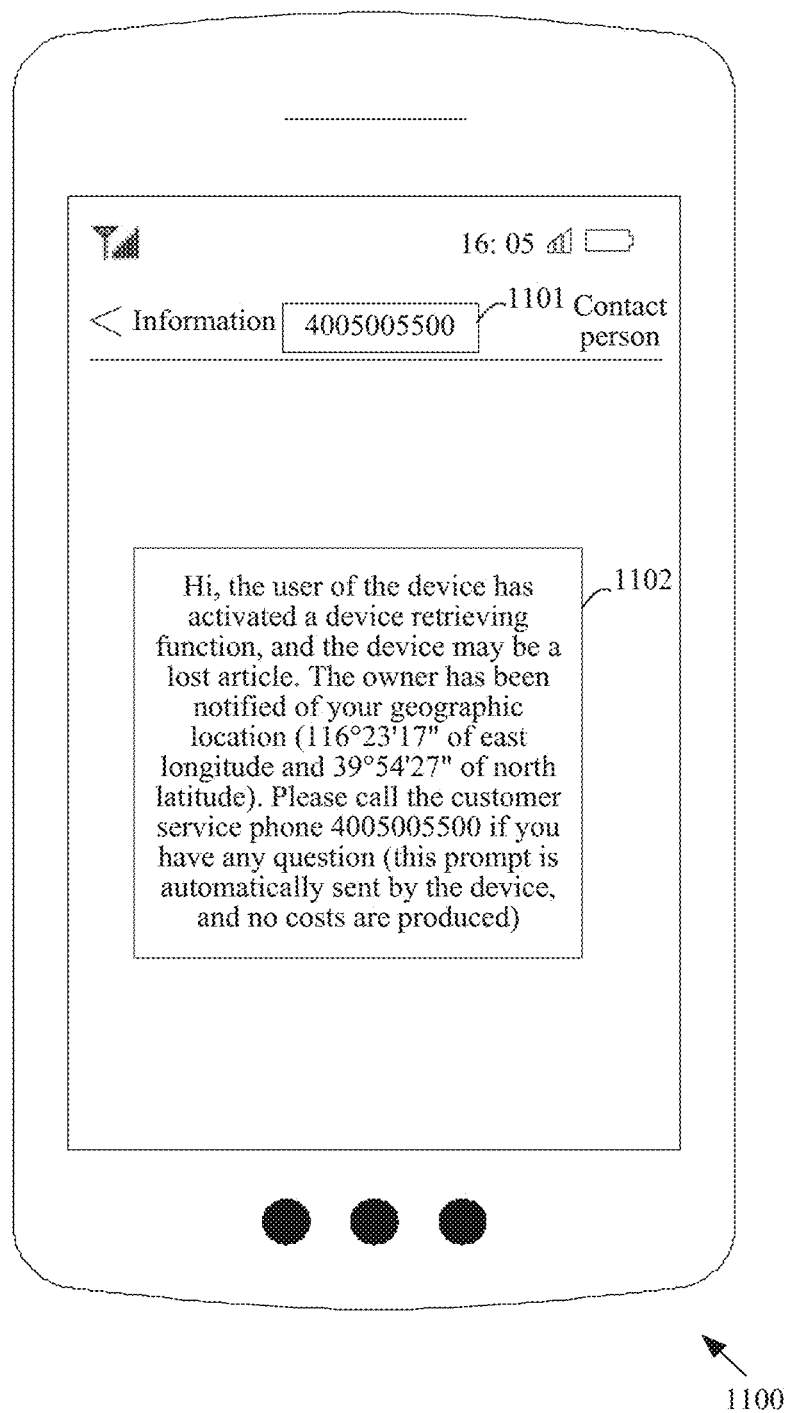
FIG. 11 shows an example of an interface on which a mobile terminal presents an SMS message according to still another embodiment of the present invention.

Optionally, when the security agent detects that the operating system has no integrity, the mobile terminal 10 may generate an SMS message (a message 1102 in FIG. 11) including current geographic location information of the mobile terminal 10, and simulate an existing SMS message receiving procedure, to finally present an SMS message similar to the SMS message in FIG. 11 to the SMS application of the mobile terminal 10. In this way, after viewing the SMS message, a current user (for example, a thief) of the mobile terminal 10 may be worried that a location of the current user has been found, and may return the mobile terminal 10 to the owner in time.

In the embodiments of the present invention, after the operating system of the mobile terminal 10 is illegally tampered with, the mobile terminal 10 may proactively report the geographic location information to the remote server 103, or obtain the geographic location information by using the positioning instruction delivered by the remote server 103 and report the geographic location information to the remote server 103. In this way, after the mobile terminal 10 is lost or stolen, the user 101 can learn of the current location information of the mobile terminal 10 in time, and quickly retrieve the mobile terminal 10.

Figure 12:
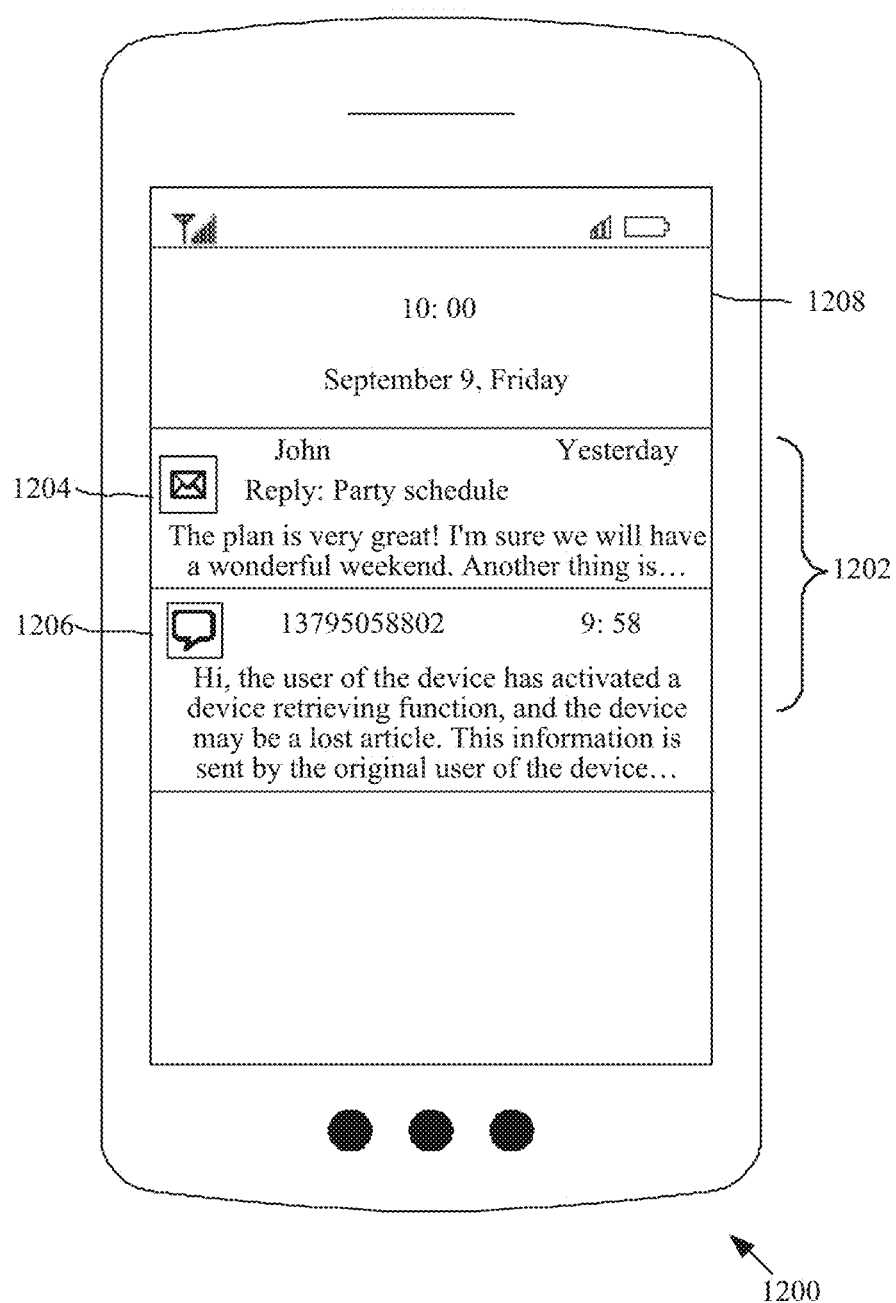
FIG. 12 shows an example of an interface on which an SMS message notification is presented in a notification window according to an embodiment of the present invention.
Figure 14:
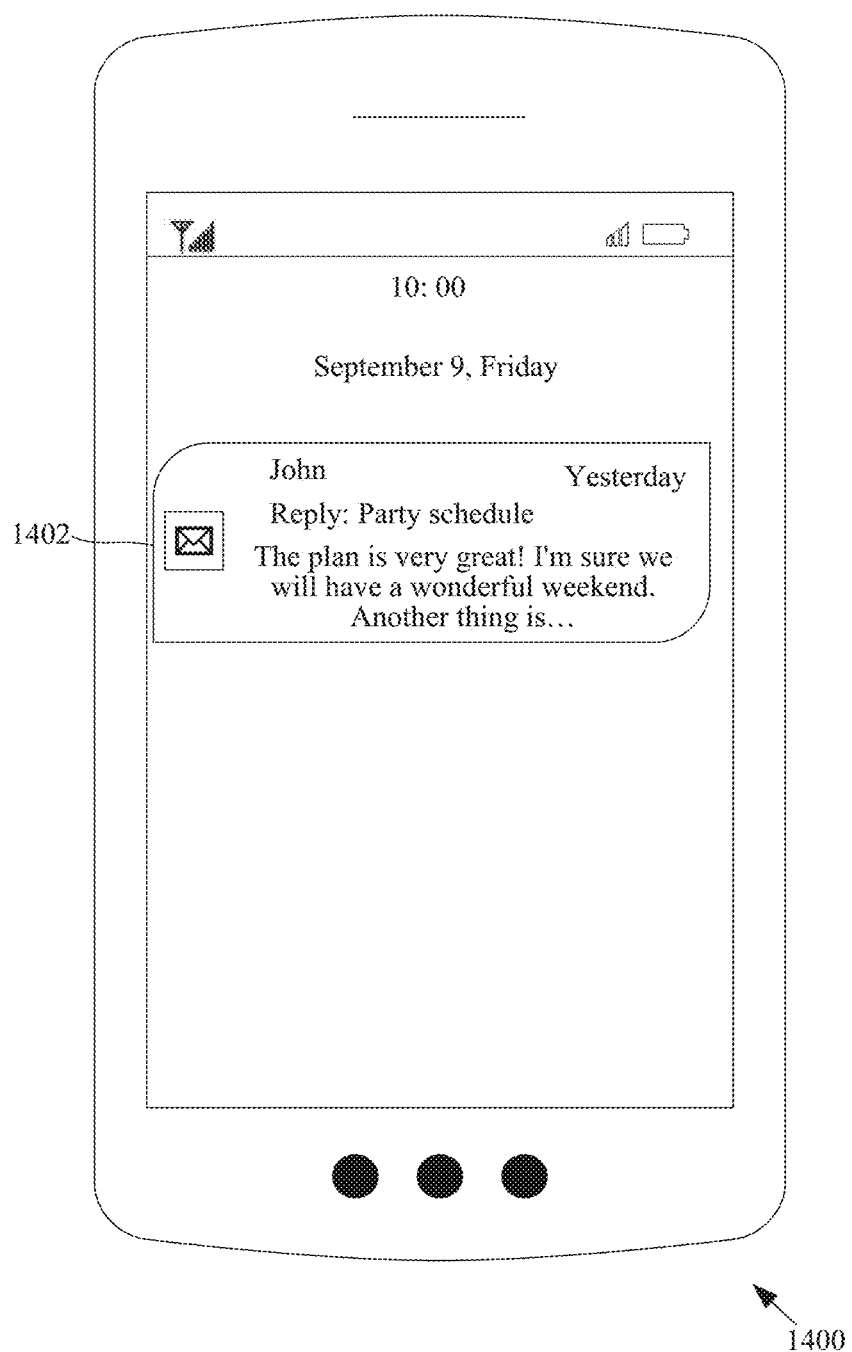
FIG. 14 shows an example of an interface on which an SMS message notification is presented in a notification window according to another embodiment of the present invention.

In some implementations, referring to FIG. 12, a display displays a notification window 1208 when the mobile terminal is in an unlocked state. The notification window 1208 may display a received notification (for example, an SMS message notification, an email notification, or an instant messaging message notification) for an event. The notification window 1208 may include a notification list 1202. The notification list 1202 may be a list of previously received notifications. Specifically, when each notification in the notification list 1202 is initially received, the notification can be separately displayed (for example, as shown in FIG. 14). Because the user does not respond to the notification, the notification is added to the notification list 1202 as a single element. The notification list 1202 includes an email notification message 1204 and an SMS message notification 1206. The SMS message notification 1206 is generated when it is detected that the operating system currently running on the mobile terminal has no integrity. For a specific method for detecting the integrity of the operating system and a specific method for generating the SMS message, refer to the foregoing implementation methods. Specifically, an antitheft notification method in the unlocked state includes: generating a short message service (SMS) message, where the SMS message is generated when a baseband processor detects that an operating system running on an application processor has no integrity; receiving a notification for the SMS message; detecting that the mobile terminal is being in an unlocked state; detecting that a user has chosen to access a notification center; and displaying the notification center. The notification center includes a pane associated with the notification for the SMS message.

Figure 13:
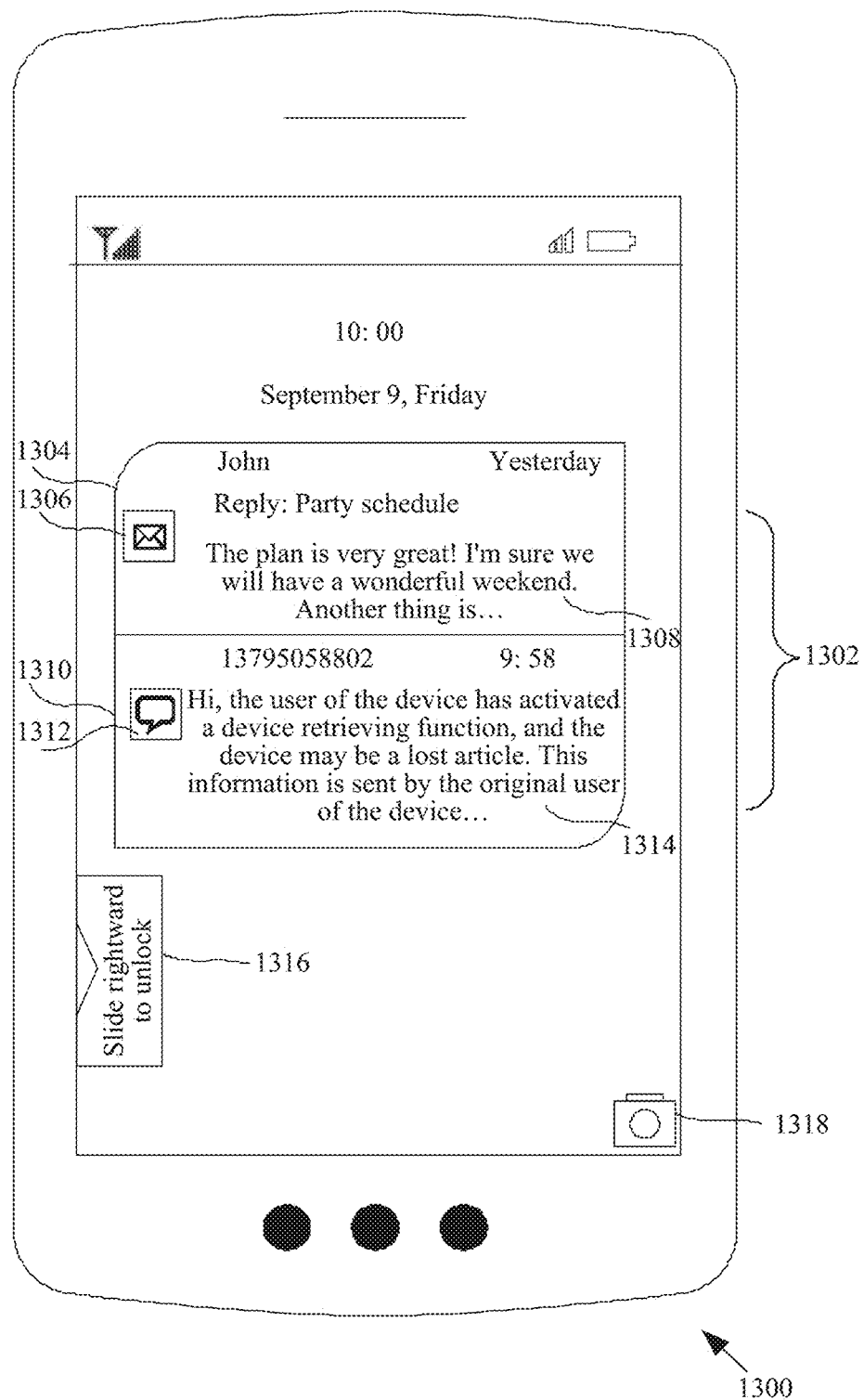
FIG. 13 shows an example of an interface on which an SMS message notification is presented on a lock screen interface according to an embodiment of the present invention.

In some implementations, referring to FIG. 13, when the mobile terminal is in a locked state, a notification list 1302 may be displayed after a notification from an application (such as an email application, an instant messaging application, or an SMS message application) is received. Specifically, the notification list 1302 may include an email notification 1304 and an SMS message notification 1310. The notification list 1302 may include an icon 1306, and the icon 1306 may indicate an application (namely, the email application) generating the notification 1304. In addition, the notification 1304 may include text 1308, and the text 1308 can provide associated text or a part of the text received from the application. The notification list 1302 further includes an icon 1312, and the icon 1312 may indicate an application (namely, the SMS message application) generating the notification 1310.

The user can slide a slider 1316 rightward on a lock screen interface, to unlock a screen, and the user can further open a camera application 1318 on an unlocked interface. The user can further view the notification list 1302 on the lock screen interface, and can choose to directly go to an application associated with the notification 1302. For example, the user can tap the notification 1310 to access the SMS message application generating the notification 1310. Once it is detected that the user taps the notification 1310, the electronic device can be directly unlocked. After the electronic device is unlocked, a particular notification can be presented to the user in a notification generation application. The SMS message notification 1310 is generated when it is detected that the operating system currently running on the mobile terminal has no integrity. For a specific method for detecting the integrity of the operating system and a specific method for generating the SMS message, refer to the foregoing implementation methods. Specifically, an antitheft notification method in the lock screen state includes: generating a short message service (SMS) message, where the SMS message is generated when a baseband processor detects that an operating system running on an application processor has no integrity; receiving a notification for the SMS message; detecting that the mobile terminal is being in an unlocked state; detecting that a user has chosen to access a notification center; and displaying the notification center. The notification center includes a pane associated with the notification for the SMS message.

In some implementations, when it is detected that the operating system currently running on the mobile terminal has no integrity, a short message service (SMS) message is generated. Notification information of the generated SMS message can be displayed on the lock screen interface in FIG. 13 and in the notification window 1208 in the unlocked state in FIG. 12, to inform that the operating system has no integrity and to alarm a thief of or a person who picks up the mobile terminal.

In some implementations, when it is detected that the operating system currently running on the mobile terminal has no integrity, a short message service (SMS) message is generated. Notification information of the generated SMS message can be prompted regularly on the lock screen interface in FIG. 13 and in the notification window 1208 in the unlocked state in FIG. 12. For example, in FIG. 13, the user taps the notification 1310 to access the SMS message application generating the notification 1310 and views the generated SMS message. After a timing period (for example, ten minutes) expires, a notification for the generated SMS message appears in the notification list 1302 on the lock screen interface again, to inform that the operating system has no integrity and to alarm a thief of or a person who picks up the mobile terminal. A better antitheft prompt effect can be achieved through frequent prompts. In some other implementations, the generated SMS message may be always in an unread state, and the user is regularly prompted.

In some implementations, the generated SMS message may be displayed on the top of the notification list 1202 in the notification window 1208 in FIG. 12, in other words, displayed as a first item in the notification list 1202. Likewise, the generated SMS message may be displayed on the top of the notification list 1302 in the lock screen state in FIG. 13, and displayed as a first item in the notification list 1302. Likewise, the generated SMS message may be displayed on the top of an SMS message list presented in the SMS message application, and displayed as a first item in the SMS message list.

The baseband processor and the application processor of the mobile terminal configured to perform the present invention may be general-purpose processors, digital signal processors (DSP), application-specific integrated circuits (ASIC), field programmable gate arrays (FPGA) or other programmable logic devices, transistor logic devices, hardware components, or any combination thereof. The baseband processor and the application processor may implement or execute examples of various logic blocks, modules, and circuits described with reference to content disclosed in the present invention. Alternatively, the baseband processor may be a combination of processors implementing a computing function, for example, a combination of one or more microprocessors, or a combination of a DSP and a microprocessor.

Method or algorithm steps described in combination with the content disclosed in the present invention may be implemented by hardware, or may be implemented by a processor by executing a software instruction. The software instruction may be composed of a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions described in the present invention may be implemented by hardware, software, firmware, or any combination thereof. A person skilled in the art should easily be aware that, in combination with the examples described in the embodiments disclosed in this specification, units, algorithms steps may be implemented by hardware or a combination of hardware and computer software in the present invention. Whether a function is performed by hardware or by computer software driving hardware depends on particular applications and design constraints of the technical solutions. A person skilled in the art may use different methods to implement the described functions for each particular application, but it should not be considered that the implementation goes beyond the scope of the present invention. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed:

1. An antitheft method for a mobile terminal, comprising:
retrieving, by a baseband processor, security function instructions from a first memory that is directly coupled to the baseband processor;
detecting, by the baseband processor, integrity of an operating system running on an application processor according to the security function instructions stored on the first memory, wherein the mobile terminal comprises the baseband processor, the application processor, the first memory, and a display;
generating, by the baseband processor, a short message service (SMS) message when the operating system has no integrity, wherein the SMS message indicates that the operating system has no integrity, and wherein the SMS message is generated by:
establishing by the baseband processor based on a user identity credential stored in the first memory, a connection between the mobile terminal and a remote server;
receiving, by the baseband processor using the connection, a first message from the remote server; and
encoding, by the baseband processor using an SMS message encoding format, the first message to generate the SMS message;
transferring, by the baseband processor, the SMS message to the application processor; and
controlling, by the application processor, the display to display the SMS message.

2. The antitheft method of claim 1, further comprising:
receiving, by the baseband processor using the connection, a positioning instruction from the remote server;
obtaining, by the baseband processor, geographic location information of the mobile terminal based on the positioning instruction; and
sending, by the baseband processor using the connection, the geographic location information to the remote server.

3. The antitheft method of claim 1, wherein the mobile terminal further comprises a second memory coupled to the application processor, and wherein detecting the integrity of the operating system running on the application processor comprises:
generating, by the baseband processor, a random number;
performing, by the baseband processor, a first hash calculation using the random number and a first key stored in the first memory to generate a first hash value;
transferring, by the baseband processor, the random number to the application processor;

performing, by the application processor, a second hash calculation using the random number and a second key stored in the second memory to generate a second hash value;

receiving, by the baseband processor, the second hash value from the application processor;

comparing, by the baseband processor, the first hash value with the second hash value to obtain a comparison result; and determining, by the baseband processor based on the comparison result, the integrity of the operating system, wherein the first key is the same as the second key.

4. The antitheft method of claim 2, wherein the connection is a Transport Layer Security (TLS) connection or a Secure Sockets Layer (SSL) connection.

5. A mobile terminal, comprising:
a display;
an application processor coupled to the display;
a first memory; and
a baseband processor coupled to the application processor and the first memory and configured to:
retrieve security function instructions from the first memory;
detect integrity of an operating system running on the application processor according to the security function instructions stored on the first memory;
generate a short message service (SMS) message when the operating system has no integrity, wherein the SMS message indicates that the operating system has no integrity, and wherein the SMS message is generated by:
establishing, based on a user identity credential stored in the first memory, a connection between the mobile terminal and a remote server;
receiving, using the connection, a first message from the remote server; and
encoding the first message using an SMS message encoding format to generate the SMS message; and
transfer the SMS message to the application processor, and
wherein the application processor is configured to control the display to display the SMS message.

6. The mobile terminal of claim 5, wherein the baseband processor is further configured to:
receive, using the connection, a positioning instruction from the remote server;
obtain geographic location information of the mobile terminal based on the positioning instruction; and
send, using the connection, the geographic location information to the remote server.

7. The mobile terminal of claim 5, further comprising a second memory coupled to the application processor, wherein the baseband processor is configured to detect integrity of the operating system by:
generating a random number;
performing a first hash calculation using the random number and a first key stored in the first memory to generate a first hash value;
transferring the random number to the application processor to enable the application processor to generate a second hash value by performing a second hash calculation using the random number and a second key stored in the second memory;
receiving the second hash value from the application processor;

comparing the first hash value with the second hash value to obtain a comparison result; and determining, based on the comparison result, the integrity of the operating system running on the application processor, wherein the first key is the same as the second key.

8. The mobile terminal of claim 5 wherein the connection is a Transport Layer Security (TLS) connection or a Secure Sockets Layer (SSL) connection.

9. The mobile terminal of claim 5, wherein the baseband processor and the application processor are disposed in a same integrated circuit chip.

10. The mobile terminal of claim 5, wherein the baseband processor and the application processor are disposed in different integrated circuit chips.

11. A computer program product for antitheft, wherein the computer program product is in a not-transitory computer readable medium and comprises computer instructions, and wherein a baseband processor executes the computer instructions to:
retrieve security function instructions from a first memory that is directly coupled to the baseband processor;
detect integrity of an operating system running on an application processor according to the security function instructions stored on the first memory;
generate a short message service (SMS) message when the operating system has no integrity, wherein the SMS message indicates that the operating system has no integrity, and wherein the SMS message is generated by:
establishing, based on a user identity credential, a connection between a mobile terminal that comprises the baseband processor and a remote server;
receiving, using the connection, a first message from the remote server; and
encoding the first message using an SMS message encoding format to generate the SMS message; and
display the SMS message.

12. The computer program product of claim 11, wherein the baseband processor further executes the computer instructions to:
receive, using the connection, a positioning instruction from the remote server;
obtain geographic location information of the mobile terminal based on the positioning instruction; and
send, using the connection, the geographic location information to the remote server.

13. The computer program product of claim 11, wherein the connection is a Transport Layer Security (TLS) connection.

14. The computer program product of claim 11, wherein the connection is a Secure Sockets Layer (SSL) connection.

15. The antitheft method of claim 1, wherein the SMS message comprises a phone number to call.

16. The antitheft method of claim 1, wherein the SMS message comprises a suggested action.

17. The mobile terminal of claim 5, wherein the SMS message comprises a phone number to call.

18. The mobile terminal of claim 5, Wherein the SMS message comprises a suggested action.

19. The computer program product of claim 11, wherein the SMS message comprises a phone number to call.

20. The computer program product of claim 11, wherein the SMS message comprises a suggested action.

* * * * *

UNITED STATES PATENT AND TRADEMARK OFFICE
CERTIFICATE OF CORRECTION

PATENT NO. : 10,687,216 B2
APPLICATION NO. : 16/333136
DATED : June 16, 2020
INVENTOR(S) : Ying et al.

Page 1 of 1

It is certified that error appears in the above-identified patent and that said Letters Patent is hereby corrected as shown below:

In the Claims

Claim 11, Column 24, Line 17: "is not –transitory computer" should read "is non–transitory computer"

Claim 18, Column 24, Line 59: "claim 5, Wherein the SMS" should read "claim 5, wherein the SMS"

Signed and Sealed this
Eighteenth Day of August, 2020

Andrei Iancu
*Director of the United States Patent and Trademark Office*